US012211003B2

(12) United States Patent
Lert, Jr. et al.

(10) Patent No.: US 12,211,003 B2
(45) Date of Patent: Jan. 28, 2025

(54) INVENTORY MANAGEMENT SYSTEM AND METHOD

(71) Applicant: Walmart Apollo, LLC, Bentonville, AR (US)

(72) Inventors: John G. Lert, Jr., Wakefield, MA (US); William J. Fosnight, Windham, NH (US)

(73) Assignee: Walmart Apollo, LLC, Bentonville, AR (US)

( * ) Notice: Subject to any disclaimer, the term of this patent is extended or adjusted under 35 U.S.C. 154(b) by 113 days.

(21) Appl. No.: 17/859,764

(22) Filed: Jul. 7, 2022

(65) Prior Publication Data

US 2022/0343269 A1 Oct. 27, 2022

Related U.S. Application Data

(63) Continuation of application No. 17/223,714, filed on Apr. 6, 2021, now Pat. No. 11,836,672, which is a
(Continued)

(51) Int. Cl.
*G06Q 10/087* (2023.01)
*B65G 1/137* (2006.01)
(Continued)

(52) U.S. Cl.
CPC ......... *G06Q 10/087* (2013.01); *B65G 1/1373* (2013.01); *G06Q 10/06* (2013.01);
(Continued)

(58) Field of Classification Search
CPC ...... G06Q 10/087; G06Q 10/06; G06Q 10/08; G06Q 10/0833; B65G 1/1373; H04W 4/35
See application file for complete search history.

(56) References Cited

U.S. PATENT DOCUMENTS 3,056,454 A 10/1962 Basford
3,466,045 A 9/1969 Walton
(Continued)

FOREIGN PATENT DOCUMENTS

DE 3624033 8/1987
DE 102012100354 A1 7/2013
(Continued)

OTHER PUBLICATIONS

Wal-Mart Takes First Shipments of RFID-Tagged Products; Cases and Pallets of Merchandise with the Product-Tracking Tags Arrived at Seven of the Retailer's Stores in the Dallas Area. UBM LLC, 2004. Print. (Year: 2004).*
(Continued)

*Primary Examiner* — Ashford S Hayles
(74) *Attorney, Agent, or Firm* — Fitch, Even, Tabin & Flannery LLP

(57) ABSTRACT

A system comprising a fully automated supply chain, in combination with tracking technology and the unified commerce engine (UCE). Such a system enables the exact location of every item (or each) to be tracked from the manufacturer's facility to a customer's bag. In accordance with one example, the supply chain comprises an order fulfillment system having a regional distribution center with RDC robotic automation configured to accept one or more incoming pallets, each pallet having a plurality of common cases of goods with each case of goods containing a plurality of common eaches; the RDC robotic automation further configured to remove and store the common cases of goods; the RDC robotic automation further configured to provide one or more outgoing pallets in response to a distribution center order, each outgoing pallet having a plurality of mixed cases of goods; a market distribution center having MDC robotic automation configured to accept one or more
(Continued)

Figure 1:
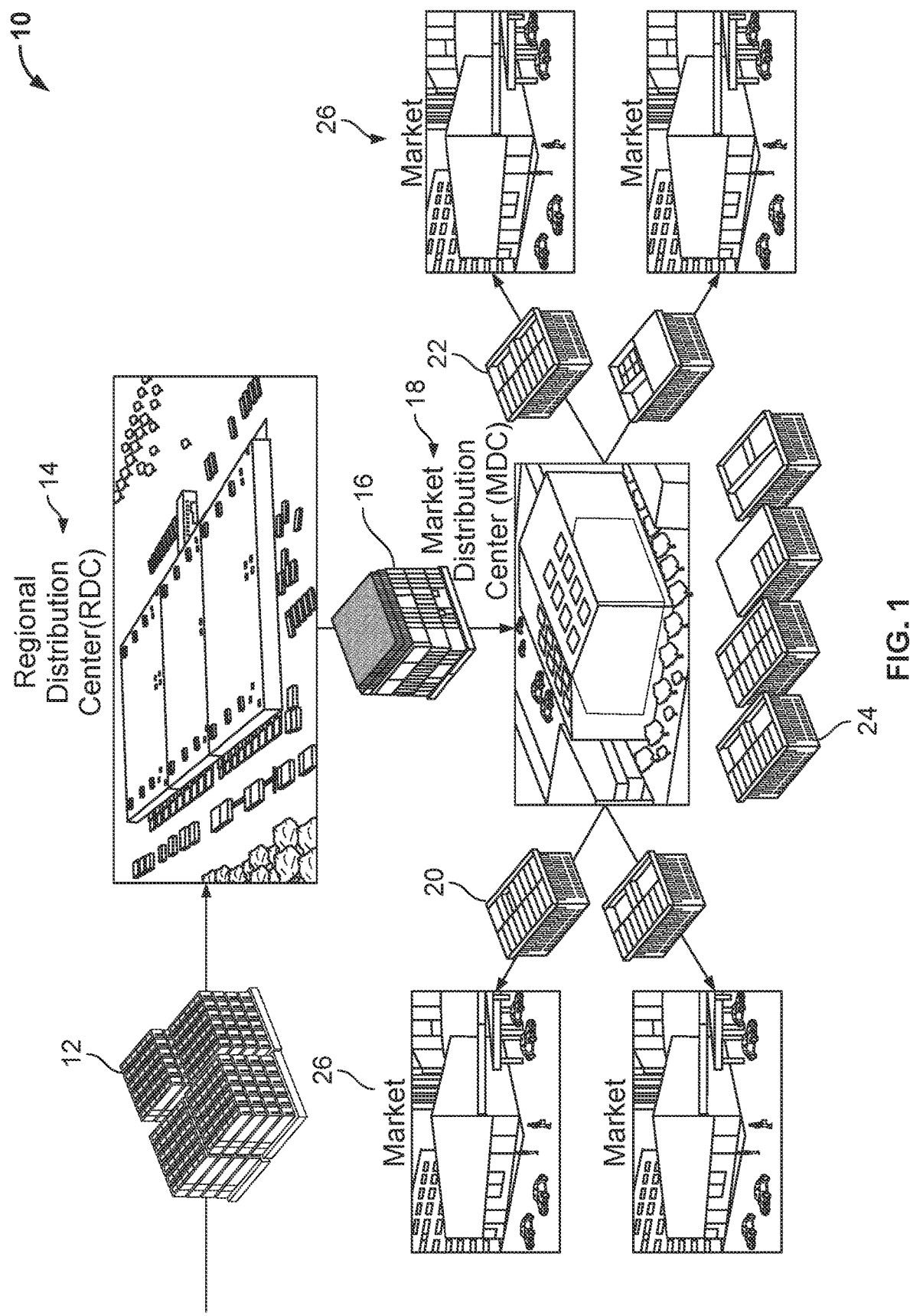

of the outgoing pallets, the MDC robotic automation further configured to remove mixed cases of goods from the one or more outgoing pallets; the MDC robotic automation further configured to remove and store eaches from each of the mixed cases of goods in an MDC storage system, the MDC robotic automation further configured to selectively retrieve eaches from the MDC storage system and fill order totes with mixed each subtotes in response to a market order. The MDC robotic automation further configured to fulfill the market order with a plurality of common or different order totes and subtotes that flexibly match the sales velocity of the market.

18 Claims, 19 Drawing Sheets

Related U.S. Application Data continuation of application No. 15/903,993, filed on Feb. 23, 2018, now Pat. No. 11,315,072.

(60) Provisional application No. 62/463,017, filed on Feb. 24, 2017.

(51) Int. Cl.
    *G06Q 10/06*       (2023.01)
    *G06Q 10/08*       (2024.01)
    *G06Q 10/0833*     (2023.01)
    *H04W 4/35*       (2018.01)

(52) U.S. Cl.
    CPC ......... *G06Q 10/08* (2013.01); *G06Q 10/0833* (2013.01); *H04W 4/35* (2018.02)

(56) References Cited

U.S. PATENT DOCUMENTS

| | | | |
|---|---|---|---|
| 3,927,773 A | 12/1975 | Bright | |
| 4,007,843 A | 2/1977 | Lubbers et al. | |
| 4,221,076 A | 9/1980 | Ozawa | |
| 4,415,975 A | 11/1983 | Burt | |
| 4,428,708 A | 1/1984 | Burt | |
| 5,143,246 A | 9/1992 | Johnson et al. | |
| 5,179,329 A | 1/1993 | Nishikawa et al. | |
| 5,433,293 A | 7/1995 | Sager | |
| 5,472,309 A | 12/1995 | Bernard et al. | |
| 5,501,295 A | 3/1996 | Muller et al. | |
| 5,526,940 A | 6/1996 | Shea et al. | |
| 5,551,823 A | 9/1996 | Maruyama | |
| 5,595,264 A | 1/1997 | Trotta, Jr. | |
| 5,636,966 A | 6/1997 | Lyon | |
| 5,642,976 A | 7/1997 | Konstant | |
| 5,825,981 A * | 10/1998 | Matsuda | G05B 19/41815 |
| | | | 901/6 |
| 5,890,136 A | 3/1999 | Kipp | |
| 5,953,234 A * | 9/1999 | Singer | B65G 1/1378 |
| | | | 700/214 |
| 5,996,316 A * | 12/1999 | Kirschner | B65G 1/1378 |
| | | | 53/238 |
| 6,289,260 B1 | 9/2001 | Bradley et al. | |
| 6,325,586 B1 | 12/2001 | Loy | |
| 6,335,685 B1 * | 1/2002 | Schrott | G06K 19/0723 |
| | | | 340/8.1 |
| 6,494,313 B1 | 12/2002 | Trescott | |
| 6,496,806 B1 * | 12/2002 | Horwitz | G06Q 10/087 |
| | | | 705/28 |
| 6,539,876 B1 | 4/2003 | Campbell et al. | |
| 6,671,580 B2 | 12/2003 | Campbell et al. | |
| 6,729,836 B2 | 5/2004 | Stingel, III | |
| 6,744,436 B1 | 6/2004 | Chirieleison, Jr. | |
| 6,805,526 B2 | 10/2004 | Stefani | |
| 6,895,301 B2 | 5/2005 | Mountz | |
| 7,054,832 B1 | 5/2006 | Vallabh | |
| 7,101,139 B1 | 9/2006 | Benedict | |
| 7,110,855 B2 | 9/2006 | Leishman | |
| 7,139,637 B1 | 11/2006 | Waddington | |
| 7,246,706 B1 | 7/2007 | Shakes et al. | |
| 7,255,525 B2 | 8/2007 | Smith et al. | |
| 7,381,022 B1 | 6/2008 | King | |
| 7,518,511 B1 * | 4/2009 | Panja | G06Q 10/087 |
| | | | 340/568.1 |
| 7,532,947 B2 | 5/2009 | Waddington et al. | |
| 7,591,630 B2 | 9/2009 | Lert, Jr. | |
| 7,603,299 B1 | 10/2009 | Dewey, Jr. | |
| 7,640,863 B2 | 1/2010 | Minges | |
| 7,751,928 B1 | 7/2010 | Antony et al. | |
| 7,861,844 B2 | 1/2011 | Hayduchok et al. | |
| 7,894,932 B2 | 2/2011 | Mountz et al. | |
| 7,894,933 B2 | 2/2011 | Mountz et al. | |
| 7,896,243 B2 | 3/2011 | Herskovitz | |
| 7,931,431 B2 | 4/2011 | Benedict et al. | |
| 7,938,324 B2 | 5/2011 | Tamarkin | |
| 7,991,505 B2 | 8/2011 | Lert, Jr. et al. | |
| 8,104,601 B2 | 1/2012 | Hayduchok et al. | |
| 8,201,737 B1 | 6/2012 | Palacios Durazo | |
| 8,276,740 B2 | 10/2012 | Hayduchok et al. | |
| 8,311,902 B2 | 11/2012 | Mountz et al. | |
| 8,327,609 B2 | 12/2012 | Krizmanic et al. | |
| 8,425,173 B2 | 4/2013 | Lert et al. | |
| 8,447,665 B1 | 5/2013 | Schoenharl et al. | |
| 8,483,869 B2 | 7/2013 | Wurman et al. | |
| 8,527,325 B1 | 9/2013 | Atreya et al. | |
| 8,579,574 B2 | 11/2013 | Hanel | |
| 8,594,835 B2 | 11/2013 | Lert et al. | |
| 8,622,194 B2 | 1/2014 | DeWitt et al. | |
| 8,626,335 B2 | 1/2014 | Wurman et al. | |
| 8,639,531 B2 | 1/2014 | Hasan | |
| 8,690,510 B1 | 4/2014 | Razumov | |
| 8,694,152 B2 | 4/2014 | Cyrulik et al. | |
| 8,718,814 B1 | 5/2014 | Clark et al. | |
| 8,721,250 B2 | 5/2014 | Razumov | |
| 8,721,251 B1 | 5/2014 | Razumov | |
| 8,734,079 B1 | 5/2014 | Razumov | |
| 8,738,177 B2 | 5/2014 | Van Ooyen et al. | |
| 8,740,538 B2 | 6/2014 | Lert et al. | |
| 8,831,984 B2 | 9/2014 | Hoffman et al. | |
| 8,892,240 B1 | 11/2014 | Vliet et al. | |
| 8,965,562 B1 | 2/2015 | Wurman et al. | |
| 8,972,045 B1 | 3/2015 | Mountz et al. | |
| 8,983,647 B1 | 3/2015 | Dwarakanath et al. | |
| 9,008,828 B1 | 4/2015 | Worsley | |
| 9,008,829 B2 | 4/2015 | Worsley | |
| 9,008,830 B2 | 4/2015 | Worsley | |
| 9,010,517 B2 | 4/2015 | Hayduchok et al. | |
| 9,020,632 B2 | 4/2015 | Naylor | |
| 9,037,286 B2 | 5/2015 | Lert | |
| 9,051,120 B2 | 6/2015 | Lert et al. | |
| 9,096,375 B2 | 8/2015 | Lert et al. | |
| 9,111,251 B1 | 8/2015 | Brazeau | |
| 9,120,622 B1 | 9/2015 | Elazary | |
| 9,129,250 B1 | 9/2015 | Sestini et al. | |
| 9,139,363 B2 | 9/2015 | Lert | |
| 9,147,208 B1 | 9/2015 | Argue | |
| 9,216,857 B1 | 12/2015 | Kalyan | |
| 9,242,798 B2 | 1/2016 | Guan | |
| 9,242,799 B1 | 1/2016 | O'Brien et al. | |
| 9,260,245 B2 | 2/2016 | Este et al. | |
| 9,321,591 B2 | 4/2016 | Lert et al. | |
| 9,330,373 B2 | 5/2016 | Mountz et al. | |
| 9,334,113 B2 | 5/2016 | Naylor | |
| 9,334,116 B2 | 5/2016 | DeWitt et al. | |
| 9,378,482 B1 | 6/2016 | Pikler et al. | |
| 9,396,451 B2 * | 7/2016 | Waddington | G06Q 30/0633 |
| 9,409,664 B1 | 8/2016 | Vliet | |
| 9,423,796 B2 | 8/2016 | Sullivan et al. | |
| 9,428,295 B2 | 8/2016 | Vliet et al. | |
| 9,463,927 B1 * | 10/2016 | Theobald | B65G 1/1373 |
| 9,466,045 B1 | 10/2016 | Kumar | |
| 9,487,356 B1 | 11/2016 | Aggarwal | |
| 9,550,624 B2 | 1/2017 | Khodl et al. | |
| 9,552,569 B1 * | 1/2017 | Quan | G06Q 10/087 |

(56) References Cited

U.S. PATENT DOCUMENTS

| | | | |
|---|---|---|---|
| 9,558,472 B1 | 1/2017 | Tubilla Kuri | |
| 9,626,709 B2 | 4/2017 | Koch | |
| 9,630,777 B2 | 4/2017 | Yamashita | |
| 9,733,646 B1 | 8/2017 | Nusser et al. | |
| 9,751,693 B1* | 9/2017 | Battles | B25J 9/0084 |
| 9,815,625 B2 | 11/2017 | DeWitt et al. | |
| 9,821,959 B2 | 11/2017 | Hognaland | |
| 9,827,683 B1 | 11/2017 | Hance | |
| 9,852,396 B2 | 12/2017 | Jones | |
| 9,978,036 B1 | 5/2018 | Eller | |
| 10,127,514 B2 | 11/2018 | Napoli | |
| 10,189,641 B2 | 1/2019 | Hognaland | |
| 10,192,195 B1 | 1/2019 | Brazeau | |
| 10,229,385 B2 | 3/2019 | Evers | |
| 10,336,543 B1 | 7/2019 | Sills et al. | |
| 10,360,531 B1 | 7/2019 | Stallman | |
| 10,482,421 B1 | 11/2019 | Ducrou et al. | |
| 10,579,965 B2 | 3/2020 | Meurer | |
| 11,836,672 B2 | 12/2023 | Lert, Jr. | |
| 2001/0045240 A1* | 11/2001 | Soehnlen | A23C 9/1516 |
| | | | 141/2 |
| 2002/0059121 A1 | 5/2002 | Schneider | |
| 2002/0077937 A1 | 6/2002 | Lyons et al. | |
| 2002/0082887 A1 | 6/2002 | Boyert et al. | |
| 2002/0089434 A1* | 7/2002 | Ghazarian | G08B 13/06 |
| | | | 340/988 |
| 2002/0099620 A1* | 7/2002 | Ohta | G06Q 30/0641 |
| | | | 705/28 |
| 2002/0124389 A1* | 9/2002 | Matson | B65G 1/1373 |
| | | | 29/700 |
| 2002/0130778 A1* | 9/2002 | Nicholson | G08B 13/2414 |
| | | | 340/572.1 |
| 2002/0133415 A1 | 9/2002 | Zarovinsky | |
| 2002/0143669 A1 | 10/2002 | Scheer | |
| 2003/0004784 A1* | 1/2003 | Li | H04L 67/56 |
| | | | 705/28 |
| 2003/0110104 A1 | 6/2003 | King | |
| 2003/0171962 A1* | 9/2003 | Hirth | G06Q 10/087 |
| | | | 705/7.25 |
| 2003/0197061 A1 | 10/2003 | Din | |
| 2004/0010337 A1 | 1/2004 | Mountz | |
| 2004/0010339 A1 | 1/2004 | Mountz | |
| 2004/0015418 A1* | 1/2004 | Dooley | G06Q 20/203 |
| | | | 705/28 |
| 2004/0024730 A1 | 2/2004 | Brown | |
| 2004/0111337 A1 | 6/2004 | Feeney | |
| 2004/0249497 A1 | 12/2004 | Saigh et al. | |
| 2004/0254825 A1 | 12/2004 | Hsu | |
| 2005/0035694 A1 | 2/2005 | Stevens | |
| 2005/0043850 A1 | 2/2005 | Stevens et al. | |
| 2005/0047895 A1 | 3/2005 | Lert | |
| 2005/0060246 A1 | 3/2005 | Lastinger | |
| 2005/0096936 A1 | 5/2005 | Lambers | |
| 2005/0108114 A1 | 5/2005 | Kaled | |
| 2005/0149226 A1* | 7/2005 | Stevens | B65G 1/1371 |
| | | | 700/214 |
| 2005/0149414 A1* | 7/2005 | Schrodt | G06Q 10/087 |
| | | | 705/29 |
| 2005/0182695 A1 | 8/2005 | Lubow | |
| 2005/0234580 A1* | 10/2005 | Roldan | G06Q 10/087 |
| | | | 700/106 |
| 2005/0256787 A1 | 11/2005 | Wadawadigi | |
| 2005/0267791 A1 | 12/2005 | LaVoie | |
| 2005/0278062 A1 | 12/2005 | Janert | |
| 2006/0020366 A1 | 1/2006 | Bloom | |
| 2006/0045674 A1 | 3/2006 | Craven | |
| 2006/0108419 A1 | 5/2006 | Som | |
| 2006/0182548 A1 | 8/2006 | Gretsch | |
| 2006/0182607 A1* | 8/2006 | Clark | B65G 61/00 |
| | | | 414/744.5 |
| 2006/0208885 A1* | 9/2006 | Lin | G06Q 10/00 |
| | | | 340/572.1 |
| 2006/0212164 A1* | 9/2006 | Abraham | G06K 17/0025 |
| | | | 700/215 |
| 2006/0257236 A1 | 11/2006 | Stingel, III et al. | |
| 2006/0266678 A1* | 11/2006 | Roth | B65H 29/60 |
| | | | 209/630 |
| 2007/0011053 A1 | 1/2007 | Yap | |
| 2007/0016496 A1 | 1/2007 | Bar | |
| 2007/0127691 A1 | 6/2007 | Lert, Jr. | |
| 2007/0162353 A1 | 7/2007 | Borders | |
| 2007/0210164 A1 | 9/2007 | Conlon et al. | |
| 2007/0226088 A1* | 9/2007 | Miles | G06Q 10/10 |
| | | | 705/28 |
| 2007/0239569 A1* | 10/2007 | Lucas | G06Q 10/087 |
| | | | 705/28 |
| 2007/0244758 A1 | 10/2007 | Xie | |
| 2007/0276535 A1 | 11/2007 | Haag | |
| 2007/0284442 A1 | 12/2007 | Herskovitz | |
| 2007/0293978 A1 | 12/2007 | Wurman et al. | |
| 2007/0294029 A1 | 12/2007 | D'Andrea et al. | |
| 2007/0295808 A1 | 12/2007 | Tamarkin | |
| 2008/0040244 A1 | 2/2008 | Ricciuti | |
| 2008/0041947 A1 | 2/2008 | Hollister et al. | |
| 2008/0046116 A1* | 2/2008 | Khan | B25J 9/1687 |
| | | | 700/215 |
| 2008/0119957 A1* | 5/2008 | Ellis | G06Q 10/08 |
| | | | 209/583 |
| 2008/0131241 A1 | 6/2008 | King | |
| 2008/0131255 A1* | 6/2008 | Hessler | B65B 35/50 |
| | | | 901/14 |
| 2008/0181753 A1 | 7/2008 | Bastian et al. | |
| 2008/0215180 A1 | 9/2008 | Kota | |
| 2008/0267759 A1* | 10/2008 | Morency | B65G 60/00 |
| | | | 414/788.1 |
| 2009/0074545 A1 | 3/2009 | Lert, Jr. | |
| 2009/0112675 A1* | 4/2009 | Servais | G06Q 10/06315 |
| | | | 705/7.27 |
| 2009/0149985 A1 | 6/2009 | Chirnomas | |
| 2009/0157472 A1 | 6/2009 | Burazin | |
| 2009/0249749 A1 | 10/2009 | Schill et al. | |
| 2009/0276264 A1 | 11/2009 | Pandit | |
| 2010/0010902 A1 | 1/2010 | Casey | |
| 2010/0060455 A1 | 3/2010 | Frabasile | |
| 2010/0076591 A1 | 3/2010 | Lert, Jr. | |
| 2010/0114790 A1 | 5/2010 | Strimling | |
| 2010/0234980 A1 | 9/2010 | Lapre | |
| 2010/0262278 A1 | 10/2010 | Winkler | |
| 2010/0310344 A1 | 12/2010 | Hinnen et al. | |
| 2010/0316468 A1 | 12/2010 | Lert et al. | |
| 2010/0316469 A1 | 12/2010 | Lert et al. | |
| 2010/0316470 A1 | 12/2010 | Lert | |
| 2010/0322746 A1 | 12/2010 | Lert | |
| 2010/0322747 A1 | 12/2010 | Lert et al. | |
| 2011/0008138 A1 | 1/2011 | Yamashita | |
| 2011/0084129 A1* | 4/2011 | Grant | G06Q 10/08 |
| | | | 235/494 |
| 2011/0238207 A1 | 9/2011 | Bastian, II et al. | |
| 2011/0243707 A1 | 10/2011 | Dumas et al. | |
| 2011/0295644 A1* | 12/2011 | Hara | G06Q 10/0639 |
| | | | 705/7.38 |
| 2011/0320034 A1* | 12/2011 | Dearlove | G06Q 10/083 |
| | | | 705/337 |
| 2011/0320308 A1* | 12/2011 | Dearlove | G06Q 10/083 |
| | | | 705/26.8 |
| 2012/0029683 A1 | 2/2012 | Keller et al. | |
| 2012/0075071 A1* | 3/2012 | Liu | B65D 19/001 |
| | | | 235/492 |
| 2012/0101627 A1 | 4/2012 | Lert | |
| 2012/0143427 A1 | 6/2012 | Hoffman et al. | |
| 2012/0150340 A1 | 6/2012 | Suess | |
| 2012/0173351 A1 | 7/2012 | Hanson et al. | |
| 2012/0186942 A1 | 7/2012 | Toebes et al. | |
| 2012/0195720 A1 | 8/2012 | Sullivan et al. | |
| 2012/0219397 A1 | 8/2012 | Baker | |
| 2012/0298688 A1 | 11/2012 | Stiernagle | |
| 2012/0330458 A1 | 12/2012 | Weiss | |
| 2013/0087610 A1* | 4/2013 | Shin | G06Q 10/08 |
| | | | 235/375 |
| 2013/0181586 A1 | 7/2013 | Hognaland | |
| 2013/0226718 A1 | 8/2013 | Ascamunz et al. | |
| 2013/0235206 A1 | 9/2013 | Smith | |

(56) References Cited

U.S. PATENT DOCUMENTS

| | | |
|---|---|---|
| 2013/0245810 A1 | 9/2013 | Sullivan |
| 2013/0246229 A1 | 9/2013 | Mountz et al. |
| 2013/0310967 A1 | 11/2013 | Olson |
| 2013/0317642 A1 | 11/2013 | Asaria et al. |
| 2013/0324151 A1* | 12/2013 | Lee .................. H04W 24/00 |
| | | 455/456.1 |
| 2013/0346204 A1 | 12/2013 | Wissner-Gross |
| 2014/0003727 A1 | 1/2014 | Lortz |
| 2014/0040075 A1* | 2/2014 | Perry ................. G06Q 30/0635 |
| | | 705/26.81 |
| 2014/0052498 A1 | 2/2014 | Marshall et al. |
| 2014/0062699 A1 | 3/2014 | Heine et al. |
| 2014/0074745 A1* | 3/2014 | Nashif .................. G06Q 10/04 |
| | | 705/337 |
| 2014/0088758 A1 | 3/2014 | Lert et al. |
| 2014/0100769 A1 | 4/2014 | Wurman |
| 2014/0100999 A1 | 4/2014 | Mountz |
| 2014/0136218 A1 | 5/2014 | Bolene |
| 2014/0143099 A1 | 5/2014 | Wilkins |
| 2014/0156553 A1 | 6/2014 | Leach |
| 2014/0212249 A1 | 7/2014 | Kawano |
| 2014/0244026 A1* | 8/2014 | Neiser .................. B65G 1/1378 |
| | | 700/216 |
| 2014/0257555 A1 | 9/2014 | Bastian, II |
| 2014/0271063 A1 | 9/2014 | Lert et al. |
| 2014/0279294 A1 | 9/2014 | Field-Darragh |
| 2014/0288696 A1* | 9/2014 | Lert ....................... B65G 1/065 |
| | | 700/216 |
| 2014/0308098 A1 | 10/2014 | Lert et al. |
| 2014/0324491 A1 | 10/2014 | Banks |
| 2014/0330603 A1 | 11/2014 | Corder et al. |
| 2014/0336814 A1 | 11/2014 | Moore |
| 2014/0343714 A1* | 11/2014 | Clark ........................ B25J 9/16 |
| | | 700/214 |
| 2014/0343717 A1 | 11/2014 | Dorval et al. |
| 2014/0350715 A1 | 11/2014 | Gopalakrishnan et al. |
| 2014/0350717 A1* | 11/2014 | Dagle ................. B65G 1/1373 |
| | | 700/216 |
| 2014/0351101 A1 | 11/2014 | Danelski |
| 2015/0032252 A1 | 1/2015 | Galluzzo et al. |
| 2015/0051994 A1 | 2/2015 | Ward |
| 2015/0071743 A1 | 3/2015 | Lert |
| 2015/0073589 A1 | 3/2015 | Khodl |
| 2015/0134490 A1 | 5/2015 | Collin |
| 2015/0154535 A1 | 6/2015 | Wappler |
| 2015/0170256 A1 | 6/2015 | Pettyjohn et al. |
| 2015/0178671 A1 | 6/2015 | Jones |
| 2015/0178673 A1* | 6/2015 | Penneman ............... B61K 1/00 |
| | | 104/18 |
| 2015/0266672 A1 | 9/2015 | Lert et al. |
| 2015/0286967 A1 | 10/2015 | Lert et al. |
| 2015/0291357 A1 | 10/2015 | Razumov |
| 2015/0294333 A1 | 10/2015 | Avegliano et al. |
| 2015/0307279 A1 | 10/2015 | Almada |
| 2015/0310447 A1 | 10/2015 | Shaw |
| 2015/0332213 A1* | 11/2015 | Galluzzo ............. B25J 15/0085 |
| | | 700/218 |
| 2015/0375398 A1 | 12/2015 | Penn |
| 2015/0375938 A9 | 12/2015 | Lert et al. |
| 2016/0016733 A1 | 1/2016 | Lert |
| 2016/0031644 A1 | 2/2016 | Schubilske |
| 2016/0055452 A1 | 2/2016 | Qin |
| 2016/0063604 A1 | 3/2016 | Shaffer et al. |
| 2016/0075512 A1 | 3/2016 | Lert |
| 2016/0086255 A1 | 3/2016 | Sainfort et al. |
| 2016/0101940 A1* | 4/2016 | Grinnell ............... G05D 1/0289 |
| | | 700/218 |
| 2016/0107838 A1 | 4/2016 | Swinkels et al. |
| 2016/0110702 A1 | 4/2016 | Landers, Jr. et al. |
| 2016/0129592 A1 | 5/2016 | Saboo |
| 2016/0140488 A1 | 5/2016 | Lindbo |
| 2016/0145045 A1 | 5/2016 | Mountz et al. |
| 2016/0167227 A1 | 6/2016 | Wellman et al. |
| 2016/0171592 A1 | 6/2016 | Pugh et al. |
| 2016/0176638 A1* | 6/2016 | Toebes ................. G05D 1/0282 |
| | | 701/25 |
| 2016/0182548 A1 | 6/2016 | Ghabra et al. |
| 2016/0194151 A1 | 7/2016 | Lindbo |
| 2016/0223339 A1 | 8/2016 | Pellow |
| 2016/0236867 A1 | 8/2016 | Brazeau et al. |
| 2016/0244262 A1* | 8/2016 | O'Brien .................... B25J 9/16 |
| 2016/0253740 A1 | 9/2016 | Goulart |
| 2016/0260158 A1 | 9/2016 | High et al. |
| 2016/0299782 A1 | 10/2016 | Jones |
| 2016/0304280 A1* | 10/2016 | Elazary .................. B25J 15/06 |
| 2016/0304281 A1 | 10/2016 | Elazary et al. |
| 2016/0307153 A1 | 10/2016 | Loken et al. |
| 2016/0311617 A1 | 10/2016 | Van Den Berk |
| 2016/0314431 A1 | 10/2016 | Quezada |
| 2016/0325933 A1* | 11/2016 | Stiernagle ................. B65G 1/10 |
| 2016/0327941 A1 | 11/2016 | Stiernagle et al. |
| 2016/0347545 A1 | 12/2016 | Lindbo et al. |
| 2016/0355337 A1 | 12/2016 | Lert et al. |
| 2016/0364786 A1 | 12/2016 | Wankhede |
| 2016/0371650 A1 | 12/2016 | Schmidt et al. |
| 2017/0036798 A1 | 2/2017 | Prahlad |
| 2017/0043953 A1 | 2/2017 | Battles |
| 2017/0066592 A1 | 3/2017 | Bastian, II |
| 2017/0068973 A1 | 3/2017 | Sinkel |
| 2017/0088360 A1 | 3/2017 | Brazeau et al. |
| 2017/0113910 A1 | 4/2017 | Becchi et al. |
| 2017/0132559 A1 | 5/2017 | Jones |
| 2017/0136632 A1 | 5/2017 | Wagner |
| 2017/0137222 A1 | 5/2017 | Lert, Jr. |
| 2017/0137223 A1 | 5/2017 | Lert, Jr. |
| 2017/0158430 A1 | 6/2017 | Raizer |
| 2017/0166356 A1 | 6/2017 | Tubilla Kuri |
| 2017/0166399 A1 | 6/2017 | Stubbs et al. |
| 2017/0185933 A1* | 6/2017 | Adulyasak ........... G06Q 10/087 |
| 2017/0185955 A1 | 6/2017 | Hufschmid |
| 2017/0200108 A1 | 7/2017 | Au |
| 2017/0206480 A1 | 7/2017 | Naumann |
| 2017/0213186 A1 | 7/2017 | Grifoni |
| 2017/0220995 A1 | 8/2017 | Paulweber |
| 2017/0228701 A1 | 8/2017 | Wosk |
| 2017/0260008 A1 | 9/2017 | DeWitt |
| 2017/0267452 A1 | 9/2017 | Goren et al. |
| 2017/0269607 A1 | 9/2017 | Fulop |
| 2017/0278047 A1 | 9/2017 | Welty |
| 2017/0285648 A1 | 10/2017 | Welty |
| 2017/0297820 A1 | 10/2017 | Grinnell et al. |
| 2017/0301004 A1 | 10/2017 | Chirnomas |
| 2017/0313514 A1 | 11/2017 | Lert, Jr. et al. |
| 2017/0316233 A1 | 11/2017 | Kherani et al. |
| 2017/0320102 A1 | 11/2017 | McVaugh et al. |
| 2017/0322561 A1 | 11/2017 | Stiernagle |
| 2017/0323250 A1 | 11/2017 | Lindbo |
| 2017/0323412 A1* | 11/2017 | Muirhead ............. G06F 16/258 |
| 2017/0330142 A1 | 11/2017 | Kanellos et al. |
| 2017/0330270 A1 | 11/2017 | Kanellos et al. |
| 2017/0334646 A1 | 11/2017 | High et al. |
| 2017/0369244 A1 | 12/2017 | Battles et al. |
| 2018/0005173 A1 | 1/2018 | Elazary |
| 2018/0005174 A1 | 1/2018 | Dixon et al. |
| 2018/0029797 A1* | 2/2018 | Hance .................. B65G 1/0492 |
| 2018/0032949 A1 | 2/2018 | Galluzzo et al. |
| 2018/0043535 A1 | 2/2018 | Stiernagle |
| 2018/0085788 A1* | 3/2018 | Engel ....................... B07C 1/025 |
| 2018/0130015 A1 | 5/2018 | Jones et al. |
| 2018/0134492 A1 | 5/2018 | Lert, Jr. |
| 2018/0137452 A1 | 5/2018 | Khatravath |
| 2018/0182054 A1 | 6/2018 | Yao |
| 2018/0194556 A1 | 7/2018 | Lert, Jr. |
| 2018/0211203 A1 | 7/2018 | Greenberg |
| 2018/0237221 A1 | 8/2018 | Lindbo |
| 2018/0237222 A1 | 8/2018 | Issing |
| 2018/0276739 A1 | 9/2018 | Chopp |
| 2018/0300680 A1 | 10/2018 | Undernehr |
| 2018/0314991 A1 | 11/2018 | Grundberg |
| 2018/0319590 A1 | 11/2018 | Lindbo |
| 2018/0322452 A1 | 11/2018 | Millhouse et al. |
| 2018/0341908 A1 | 11/2018 | Lert, Jr. |
| 2018/0342031 A1 | 11/2018 | Tada |

(56) References Cited

U.S. PATENT DOCUMENTS

| | | |
|---|---|---|
| 2018/0346246 A1 | 12/2018 | Grinnell |
| 2019/0026770 A1 | 1/2019 | Murugesan et al. |
| 2019/0139637 A1 | 5/2019 | Ceh |
| 2019/0197451 A1 | 6/2019 | Balasingham |
| 2019/0389659 A1 | 12/2019 | Grinnell et al. |
| 2020/0039747 A1 | 2/2020 | Ahmann |
| 2021/0032034 A1 | 2/2021 | Kalouche |
| 2021/0224731 A1 | 7/2021 | Lert, Jr. |
| 2021/0253349 A1* | 8/2021 | Lert ............ B65G 1/1378 |
| 2022/0036295 A1 | 2/2022 | Lert, Jr. |
| 2022/0274776 A1 | 9/2022 | Lert, Jr. |

FOREIGN PATENT DOCUMENTS

| | | |
|---|---|---|
| EP | 0302205 A2 | 2/1989 |
| EP | 1348646 | 10/2003 |
| EP | 2650237 B1 | 11/2014 |
| EP | 2995579 | 3/2016 |
| EP | 2651786 B1 | 5/2016 |
| EP | 2651787 B1 | 5/2016 |
| EP | 3056454 | 8/2016 |
| GB | 2609678 A | 2/2023 |
| JP | H0642810 | 6/1994 |
| JP | H1135107 | 2/1999 |
| JP | 2002160813 | 6/2002 |
| JP | 2007246226 | 9/2007 |
| JP | 2007246226 A * | 9/2007 |
| JP | 2013522144 | 6/2013 |
| WO | 0068856 | 11/2000 |
| WO | 2007067868 | 6/2007 |
| WO | 2010100513 | 9/2010 |
| WO | 20100118412 A1 | 10/2010 |
| WO | 2014166640 | 10/2014 |
| WO | 2015005873 | 1/2015 |
| WO | 2005097550 | 10/2015 |
| WO | 2016172793 | 11/2016 |
| WO | 2016199033 | 12/2016 |
| WO | 2017064401 A1 | 4/2017 |
| WO | WO-2018095958 A1 * | 5/2018 ......... G06Q 10/0833 |

OTHER PUBLICATIONS

Dubey, V. K. (2015). A decision-making framework for distribution center automation in the retail industry (Order No. 3739220). Available from ProQuest Central; ProQuest Dissertations & Theses Global. (1747115348). (Year: 2015).*
Caputo, A. C., & Pelagagge, P. M. (2006). Management criteria of automated order picking systems in high-rotation high-volume distribution centers. Industrial Management & Data Systems, 106(9), 1359-1383. doi:https://doi.org/10.1108/02635570610712627 (Year: 2006).*
Ahire, Sanjay L, Manoj K Malhotra, and John B Jensen. "Carton-Mix Optimization for Walmart.Com Distribution Centers." Interfaces (Providence) 45.4 (2015): 341-357. Web. (Year: 2015).*
Office Action dated Dec. 5, 2022 in Japanese Patent Application No. 2021-156451.
Office Action dated Feb. 2, 2023 in U.S. Appl. No. 17/223,714.
Final Office Action dated Mar. 24, 2020 in U.S. Appl. No. 15/591,956.
Response to Office Action filed Jan. 24, 2020 in U.S. Appl. No. 15/591,956.
Non-Final Rejection mailed Apr. 10, 2017 in U.S. Appl. No. 15/421,208.
Amendment filed Sep. 11, 2017 in U.S. Appl. No. 15/421,208.
Supplemental Amendment filed Oct. 12, 2017 in U.S. Appl. No. 15/421,208.
Notice of Allowance and Fees Due dated Oct. 5, 2017 in U.S. Appl. No. 15/421,239.
International Search Report dated Oct. 7, 2016 in International Application No. PCT/US2016/035547.
Restriction Requirement dated Nov. 3, 2017 in U.S. Appl. No. 15/171,802, filed Jun. 2, 2016.
International Search Report and Written Opinion dated Sep. 6, 2017 in International Patent Application No. PCT/US2017/032171.
English language Abstract for WO2014166640 published Oct. 16, 2014.
Response to Restriction Requirement filed Nov. 20, 2017 in U.S. Appl. No. 15/171,802.
Notice of Allowance and Fees Due dated Dec. 8, 2017 in U.S. Appl. No. 15/421,208.
Notice of allowance and Fees Due dated Jan. 16, 2018 in U.S. Appl. No. 15/699,700.
Notice of Allowance and Fees Due dated Jan. 19, 2018 in U.S. Appl. No. 15/421,239.
International Search Report for International Application No. PCT/US2017/062423 dated Feb. 5, 2018.
Office Action dated Feb. 12, 2018 in U.S. Appl. No. 15/171,802.
Response to Office Action filed Aug. 2, 2018 in U.S. Appl. No. 15/816,832.
Final Office Action dated Aug. 7, 2018 in U.S. Appl. No. 15/171,802.
Response to Office Action filed Sep. 12, 2018 in U.S. Appl. No. 15/171,802.
Notice of Allowance and Fees Due dated Aug. 31, 2018 in U.S. Appl. No. 15/978,423.
International Search Report for International Application No. PCT/US2018/013203 dated Apr. 5, 2018.
International Search Report for International Application No. PCT/US2018/19537 dated Apr. 13, 2018.
Office Action dated May 4, 2018 in U.S. Appl. No. 15/816,832.
Response to Office Action filed May 9, 2018 in U.S. Appl. No. 15/171,802.
Office Action dated Jun. 21, 2019 in U.S. Appl. No. 15/867,373.
Response to Office Action filed Sep. 23, 2019 in European Patent Application No. 16804451.9.
Notice of Allowance and Fees Due dated Oct. 9, 2018 in U.S. Appl. No. 15/171,208.
Final Office Action dated Nov. 2, 2018 in U.S. Appl. No. 15/816,832.
Response to Office Action filed Nov. 13, 2018 in U.S. Appl. No. 15/421,208.
Notice of Allowance and Fees Due dated Jan. 29, 2019 in U.S. Appl. No. 15/171,802.
Notice of Allowance and Fees Due dated Jan. 17, 2019 in U.S. Appl. No. 15/421,208.
English language Abstract for WO2017064401 published Apr. 20, 2017.
Response to Office Action filed Mar. 12, 2021 in European Patent Application No. 18709235.8.
Non-Final Rejection mailed Nov. 18, 2019 in U.S. Appl. No. 15/903,993.
Amendment dated Apr. 16, 2020 in U.S. Appl. No. 15/903,993.
Notice of Allowance and Fees Due dated May 15, 2020 in U.S. Appl. No. 15/903,993.
Non-Final Rejection mailed Sep. 14, 2020 in U.S. Appl. No. 15/903,993.
Amendment dated Jan. 5, 2021 in U.S. Appl. No. 15/903,993.
Notice of Allowance and Fees Due dated Feb. 11, 2021 in U.S. Appl. No. 15/903,993.
Extended European Search Report dated May 12, 2021 in European Patent Application No. 21163777.2.
Response to Office Action filed May 17, 2021 in U.S. Appl. No. 16/273,449.
Supplemental Response to Office Action filed May 26, 2021 in U.S. Appl. No. 16/273,449.
Notice of Allowance and Fee(s) Due dated May 26, 2021 in U.S. Appl. No. 15/591,956.
Notice of Allowance and Fee(s) Due dated Jun. 4, 2021 in U.S. Appl. No. 15/591,956.
Notice of Allowance and Fee(s) Due dated Jun. 9, 2021 in U.S. Appl. No. 15/816,832.
Decision for Final Rejection dated May 27, 2021, and English language translation thereof, in Japanese Patent Application No. 2019-548543.
Response to Office Action filed Jun. 15, 2021, and English language machine translation thereof, in Chinese Patent Application No. 201780042943.2.

(56) References Cited

OTHER PUBLICATIONS

Final Office Action dated Oct. 20, 2021 in U.S. Appl. No. 16/594,647.
Office Action dated Jun. 18, 2021 in U.S. Appl. No. 15/903,993.
Preliminary Amendment dated Jan. 20, 2022 in U.S. Appl. No. 17/223,714.
Office Action dated Sep. 14, 2022 in Japanese Patent Application No. 2019-546194.
Office Action dated Mar. 13, 2023 in U.S. Appl. No. 17/745,627.
Automated storage. (2013). Material Handling Product News, 35(6), 22-25. Retrieved from https://www.proquest.com/trade-journals/automated-storage/docview/1469704406/se-2 (Year: 2013).
Bogue, R. (2016). Growth in e-commerce boosts innovation in the warehouse robot market. The Industrial Robot, 43(6), 583-587. doi : https ://doi .org/10.1108/1 R-07-2016-0194 (Year: 2016).
Uludag, O. (2014). GridPick: A high density puzzle based order picking system with decentralized control (Order No. 30265328). Available from ProQuest Dissertations & Theses Global. (2784388670). (Year: 2014).
Office Action dated Apr. 7, 2023 in U.S. Appl. No. 17/499,783.
Office Action dated Apr. 19, 2023 in U.S. Appl. No. 17/240,777.
K. H. Leung et al., "Design of a case-based multi-agent wave picking decision support system for handling e-commerce shipments", 2016 Portland International Conference on Management of Engineering and Technology (PICMET), Honolulu, HI, 2016, pp. 2248-2256, doi: 10.1109/PICMET .2016.7806645. (Year: 2016).
N. Viswanadham, "The past, present, and future of supply-chain automation", in IEEE Robotics & Automation Magazine, vol. 9, No. 2, pp. 48-56, Jun. 2002, doi: 10.1109/MRA.2002.1019490. (Year: 2002).
C. Wurll, "Mixed Case Palletizing with Industrial Robots", Proceedings of ISR 2016: 47th International Symposium on Robotics, Munich, Germany, 2016, pp. 1-6. (Year: 2016).
R. D'Andrea and P. Wurman, "Future challenges of coordinating hundreds of autonomous vehicles in distribution facilities", 2008 IEEE International Conference on Technologies for Practical Robot Applications, Woburn, MA, 2008, pp. 80-83, doi: 10.1109/ TEPRA.2008.4686677. (Year: 2008).
Q. Xu, "Improving responsiveness of supply chain through RFID invisibility technology", 2009 IEEE/INFORMS International Conference on Service Operations, Logistics and Informatics, Chicago, Il. 2009, pp. 513-517, doi: 10.1109/SOLI.2009.5203987. (Year: 2009).
A. Harrison and A. White, "Intelligent distribution and logistics", in IEEE Proceedings—Intelligent Transport Systems, vol. 153, No. 2, pp. 167-180, Jun. 2006, doi: 10.1049/ip-its:20060016. (Year: 2006).
C. Prasse, A. Nettstraeter and M. T. Hompel, "How IoT will change the design and operation of logistics systems", 2014 International Conference on the Internet of Things (IOT), Cambridge, MA, 2014, pp. 55-60, doi: 10.1109/IOT.2014.7030115. (Year: 2014).
Response to Office Action filed Dec. 18, 2020, with English language translation of claims as amended, in Japanese Patent Application No. 2018-515183.
Office Action dated Dec. 24, 2020, with English language translation, in Japanese Patent Application No. 2020-038556.
Office Action dated Nov. 25, 2020, with English language translation, in Japanese Patent Application No. 2019-526569.
Office Action dated Dec. 24, 2020 in U.S. Appl. No. 16/273,449.
English language Abstract for DE3624033 published Aug. 6, 1987.
Office Action dated Sep. 14, 2020 in U.S. Appl. No. 15/591,956.

International Search Report and Written Opinion dated Sep. 4, 2020 in International Patent Application No. US2020/033250.
Office Action filed Oct. 19, 2020 in U.S. Appl. No. 15/816,832.
Response to Office Action filed Nov. 2, 2020, with English machine translation, in Chinese Patent Application No. 201780042943.2.
Response to Office Action filed Aug. 31, 2020 in U.S. Appl. No. 15/816,832.
Response to Office Action filed Aug. 24, 2020 in U.S. Appl. No. 15/591,956.
Response to Office Action filed Jul. 20, 2020 in U.S. Appl. No. 15/867,373.
Office Action dated Aug. 11, 2020 in Japanese Patent Application No. 2018-515183.
Notice of Allowance and Fees Due dated Aug. 19, 2020 in U.S. Appl. No. 15/867,373.
Office Action dated Aug. 20, 2020 in U.S. Appl. No. 16/121,212.
Final Office Action dated Jun. 18, 2020 in U.S. Appl. No. 15/826,045.
Response to Office Action filed Mar. 5, 2020 in U.S. Appl. No. 15/867,373.
Office Action dated Mar. 20, 2020 in U.S. Appl. No. 15/867,373.
Extended European Search Report dated Mar. 13, 2020 in European Patent Application No. 19217215.3.
Final Office Action dated Mar. 24, 2020 in U.S. Appl. No. 15/951,956.
Response to Office Action filed Mar. 30, 2020 in U.S. Appl. No. 15/816,832.
Office Action dated Apr. 30, 2020 in U.S. Appl. No. 15/816,832.
Response to Office Action filed Apr. 15, 2020 in U.S. Appl. No. 15/826,045.
Response to Office Action filed Apr. 17, 2020 in European Patent Application No. 18709235.8.
Response to Office Action filed Mar. 6, 2020 in European Patent Application No. 18702006.0.
Office Action dated Nov. 20, 2019 in U.S. Appl. No. 15/826,045.
Office Action dated Dec. 5, 2019 in U.S. Appl. No. 15/867,373.
Preliminary Amendment filed Dec. 20, 2019 in U.S. Appl. No. 16/594,647.
Response to Office Action filed Jan. 24, 2020 in U.S. Appl. No. 15/951,956.
Response to Office Action filed Oct. 21, 2019 in U.S. Appl. No. 15/867,373.
Response to Office Action filed Oct. 29, 2019 in U.S. Appl. No. 15/826,045.
Final Office Action dated Nov. 1, 2019 in U.S. Appl. No. 15/816,832.
Notice of Allowance dated Mar. 20, 2019 in U.S. Appl. No. 15/421,208.
Response to Office Action filed Mar. 22, 2019 in U.S. Appl. No. 15/816,832.
Office Action dated Apr. 15, 2019 in U.S. Appl. No. 15/816,832.
Non-Final Rejection mailed Sep. 3, 2014 in U.S. Appl. No. 14/213,187.
Amendment filed Feb. 27, 2015 in U.S. Appl. No. 14/213,187.
Notice of Allowance and Fees Due mailed May 20, 2015 in U.S. Appl. No. 14/213,187.
Non-Final Rejection mailed Jan. 12, 2016 in U.S. Appl. No. 14/860,410.
Amendment filed Apr. 8, 2016 in U.S. Appl. No. 14/860,410.
Non-Final Rejection mailed Jul. 20, 2016 in U.S. Appl. No. 14/860,410.
Amendment filed Sep. 27, 2016 in U.S. Appl. No. 14/860,410.
Notice of Allowance and Fees Due mailed Nov. 10, 2016 in U.S. Appl. No. 14/860,410.

\* cited by examiner

Figure 2:
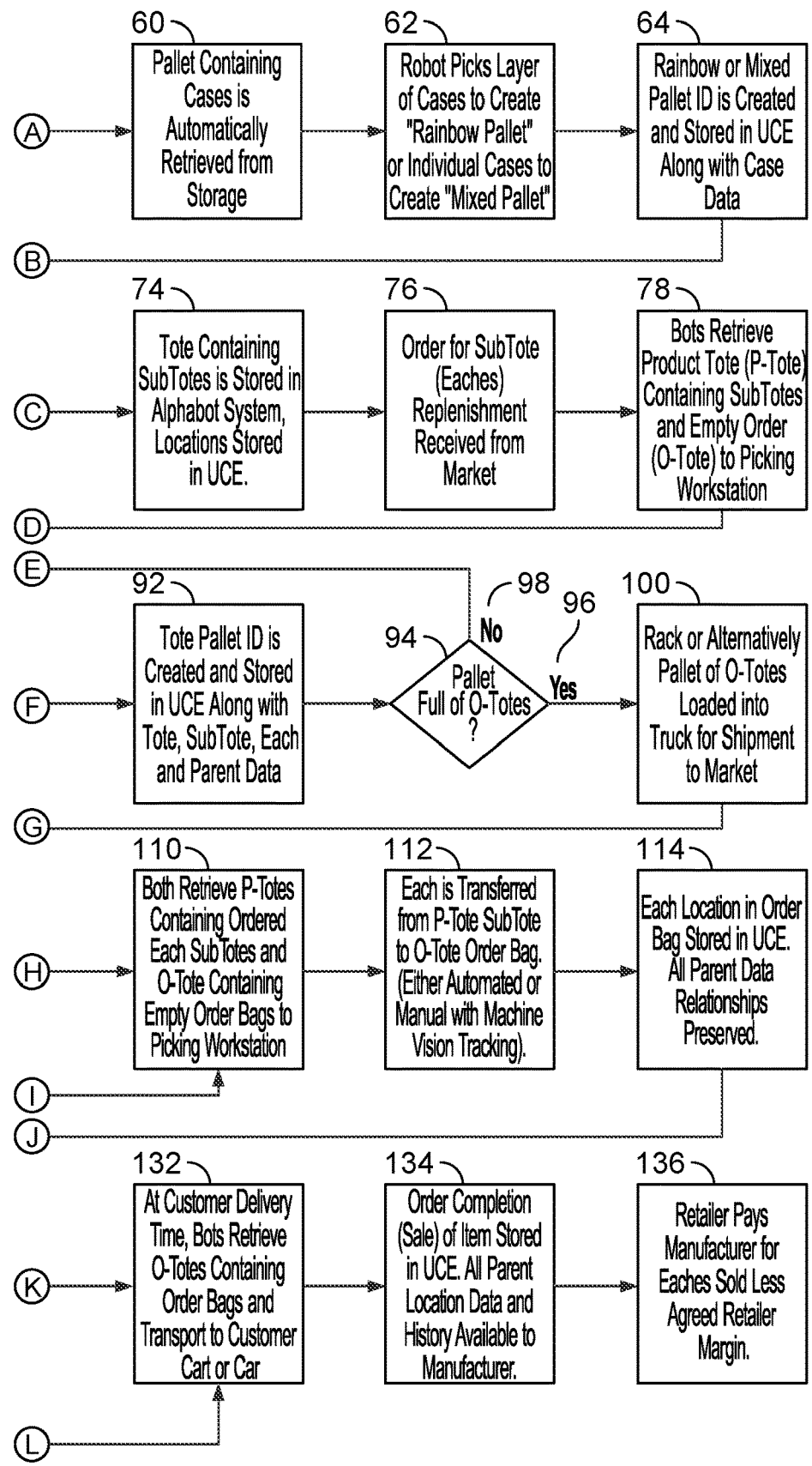

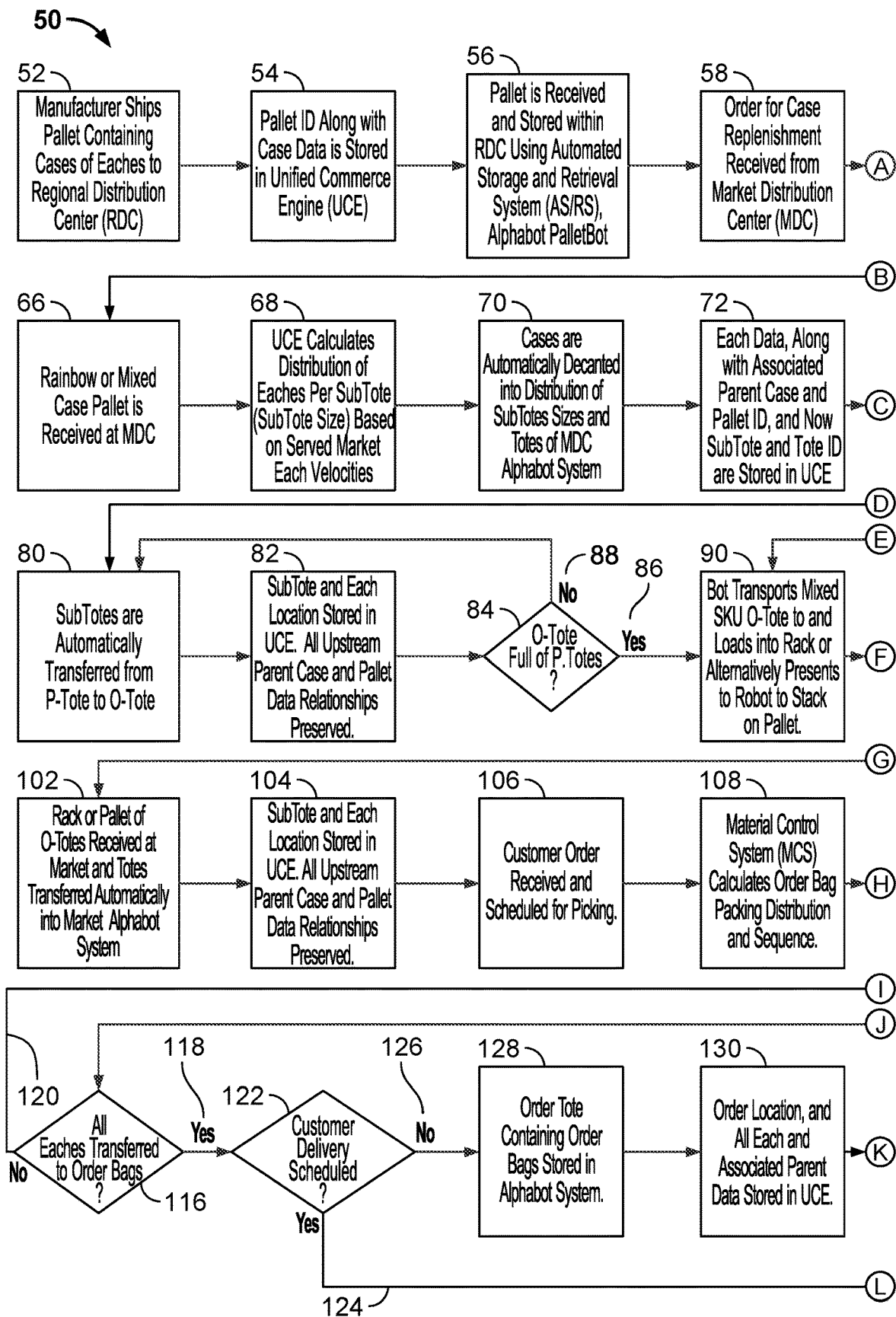
FIG. 2 Automated Retail Supply Chain

Each Picking Workstation - Automated

Each Picking Workstation - Manual

Mobile Robot 744

Order Delivery - Cart 740

INVENTORY MANAGEMENT SYSTEM AND METHOD

PRIORITY CLAIM

The present application is a continuation of U.S. patent application Ser. No. 17/223,714, filed on Apr. 6, 2021, entitled "INVENTORY MANAGEMENT SYSTEM AND METHOD," which application is a continuation of U.S. patent application Ser. No. 15/903,993, filed on Feb. 23, 2018, entitled "INVENTORY MANAGEMENT SYSTEM AND METHOD," now issued as U.S. Pat. No. 11,315,072, which application claims priority to U.S. Provisional Patent Application No. 62/463,017, filed on Feb. 24, 2017, entitled "INVENTORY MANAGEMENT SYSTEM AND METHOD," which applications are incorporated by reference herein in their entirety.

BACKGROUND

In a chain of conventional self-service stores, the most cost-efficient method of replenishing store inventories, by far, is by the "case", that is, to supply stores with the shipping cases of products received from supplying manufacturers. The alternative is to replenish by the "each" or "eaches", i.e. to supply stores with individual product units in less-than-case quantities, but that method is so much more costly that universally the primary unit of replenishment in large-format stores like supermarkets and hypermarkets is by the cases shipped in pallet shipments.

In a conventional distribution model, the retailer receives pallets of cases at a distribution center ("DC"), the essential role of which is to replenish the inventories in a network of stores by periodically shipping to each store a specific set of cases of products that are needed (have been "ordered") by that store. In the vast majority of DCs, those orders are fulfilled using a manual case-picking process in which pallets of cases are arrayed in aisles and human operators travel from one product pallet to another to transfer from each the number of cases ordered by the store, placing the selected cases on an order pallet to be shipped to the store. Those systems are not secure In that human intervention results in inventory losses. Even systems that have some degree of automation do not have an effective tracking system for tracking eaches from manufacturer to customer.

DESCRIPTION

Figure 3:
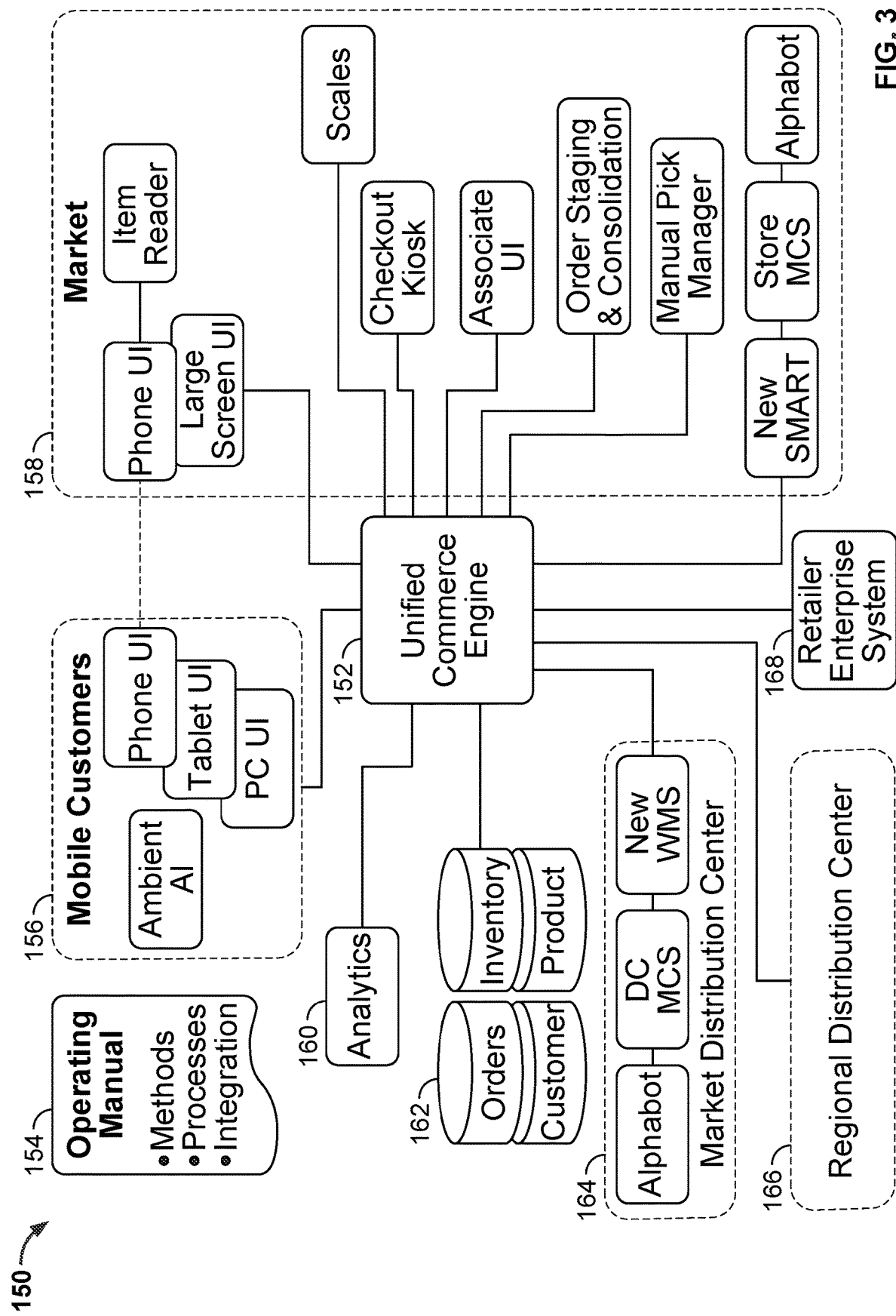
Figure 4:
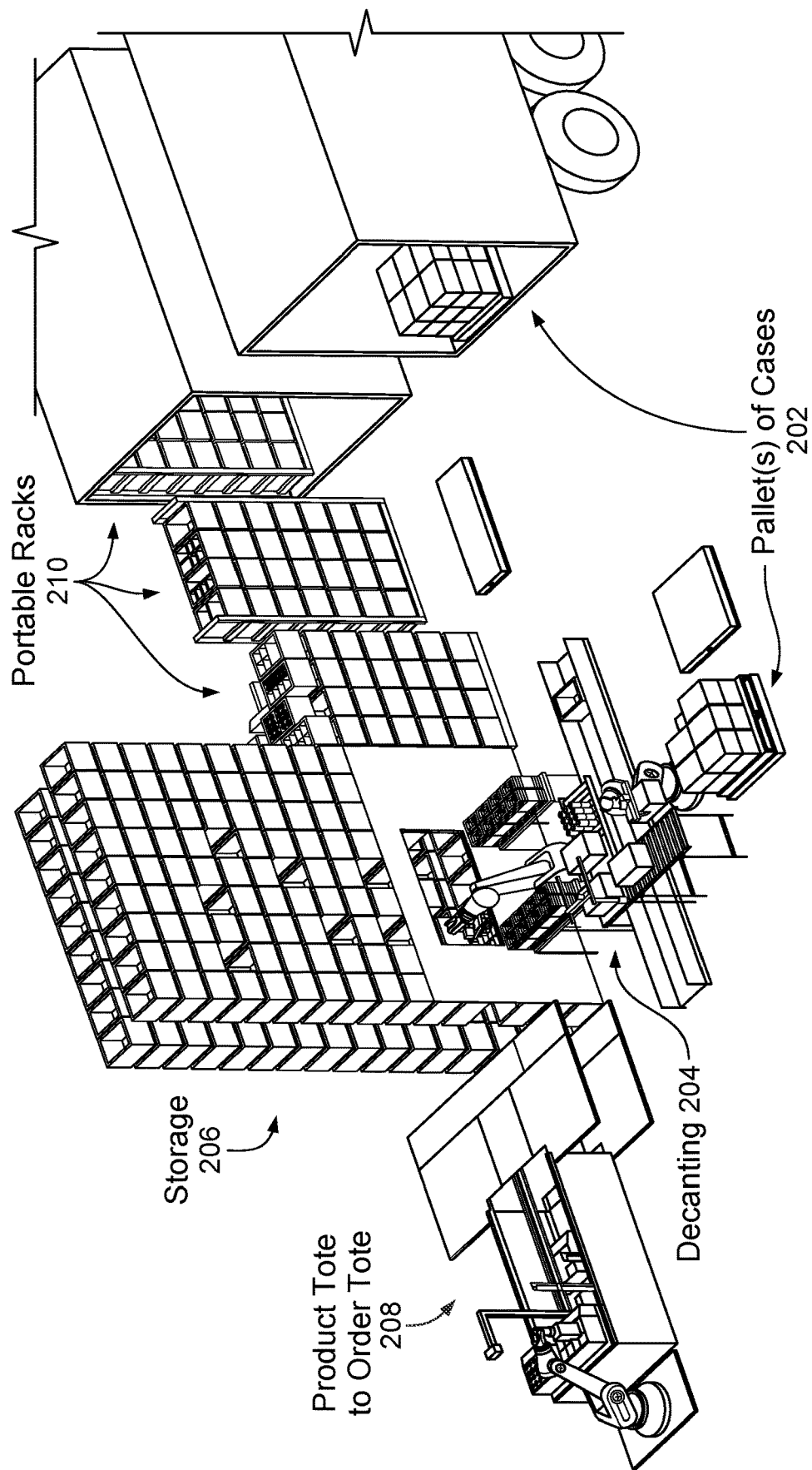
Figure 5:
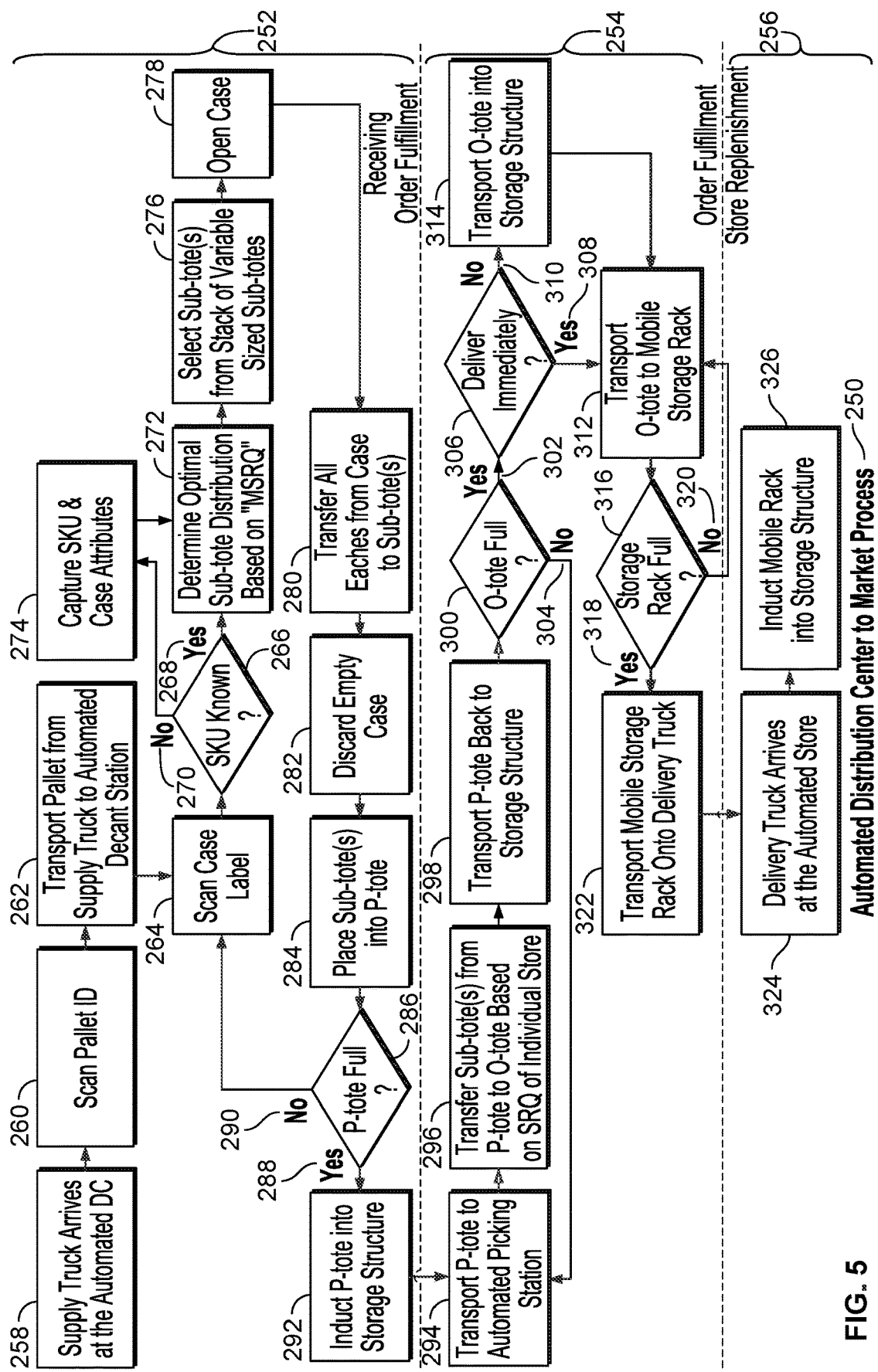
Figure 6:
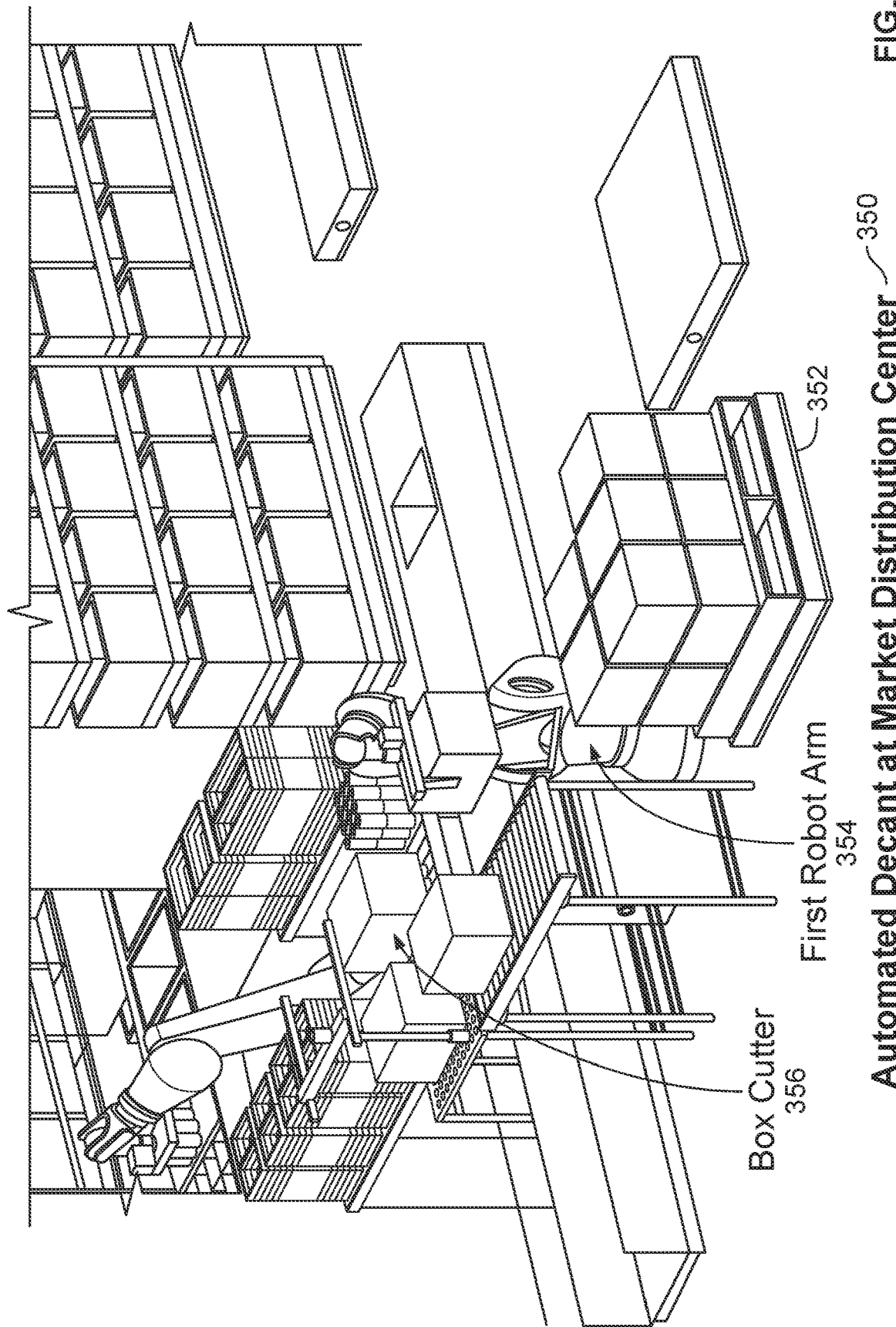
Figure 7:
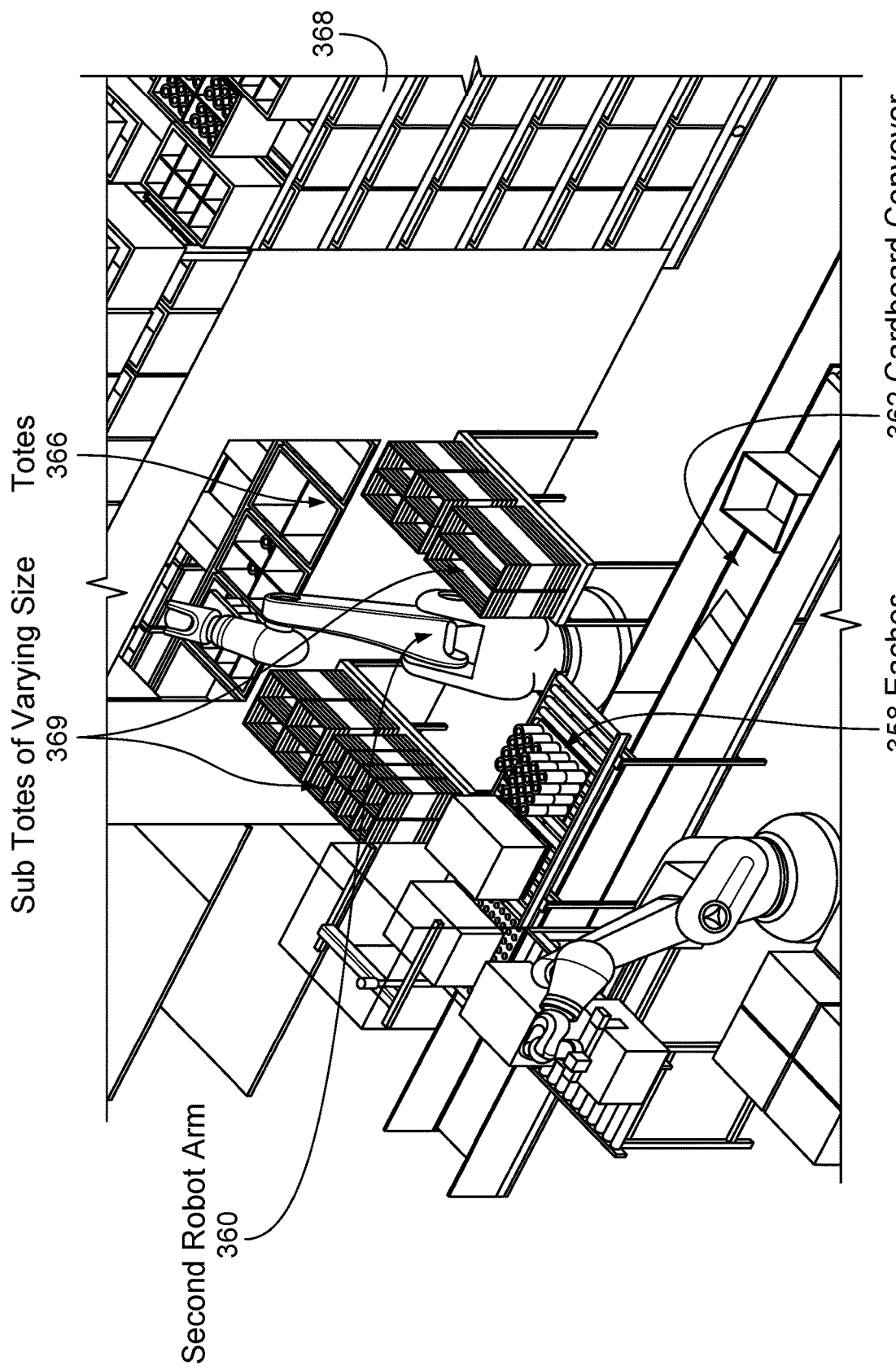
Figure 8:
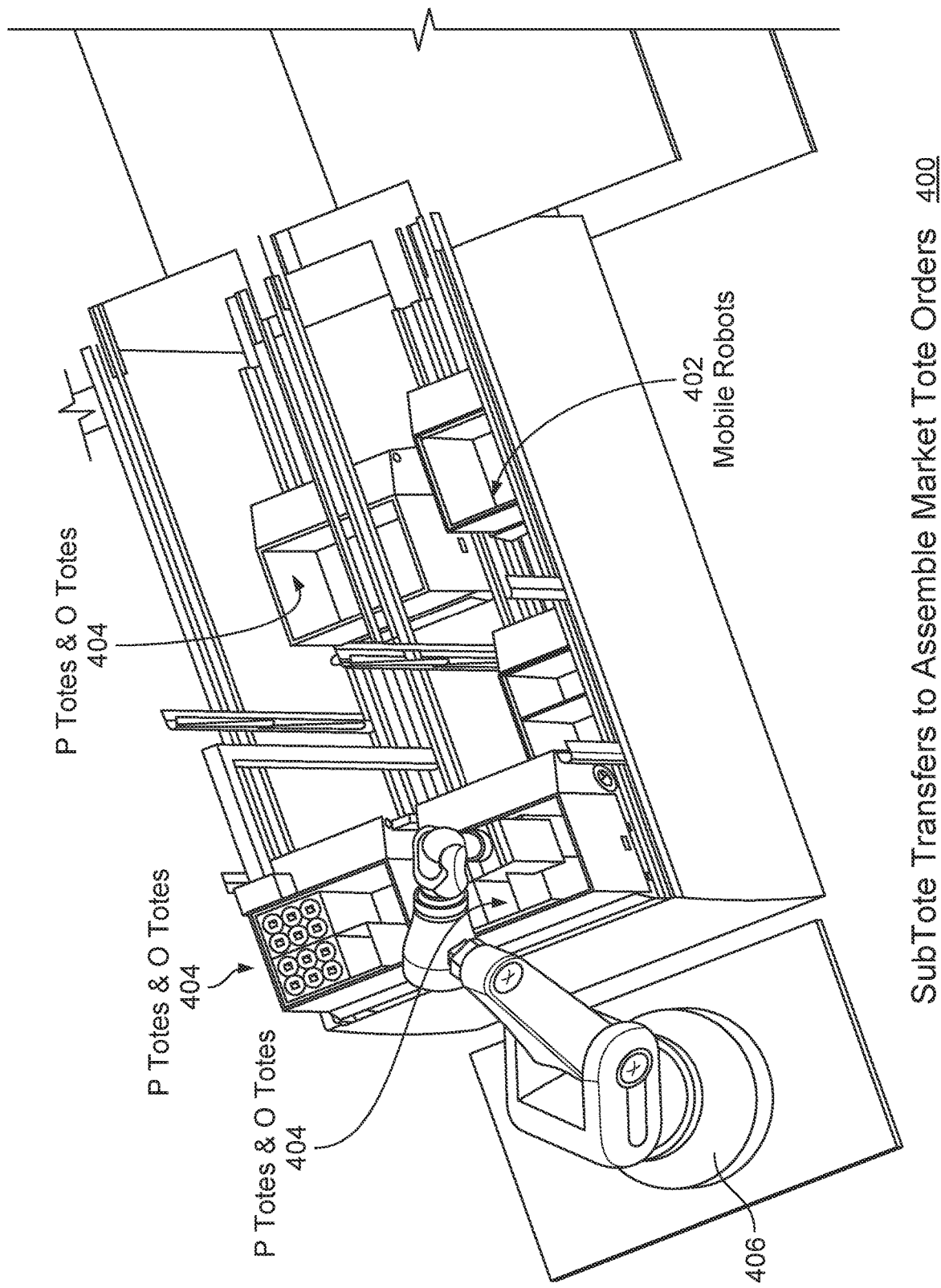
Figure 9:
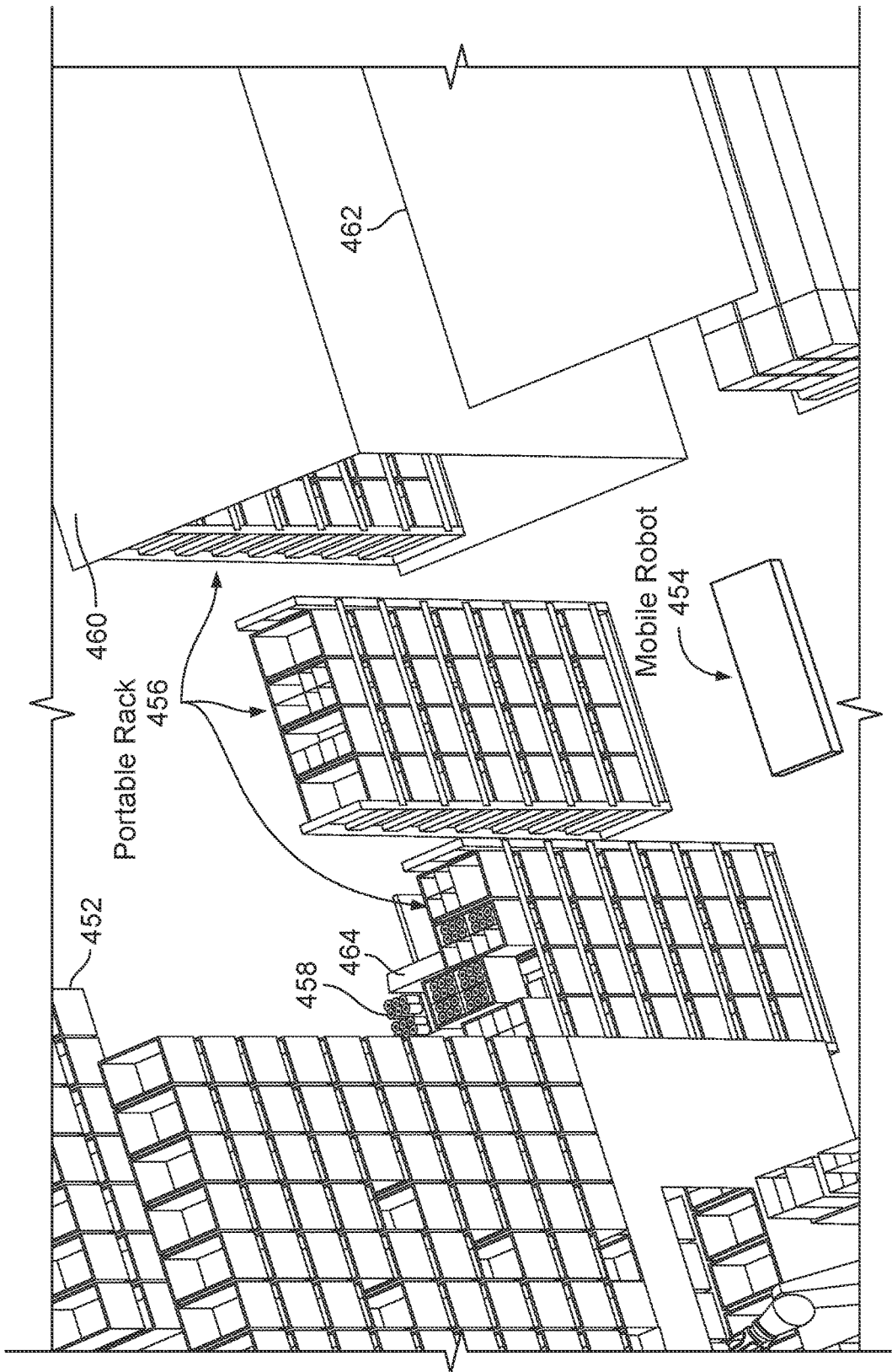
Figure 10:
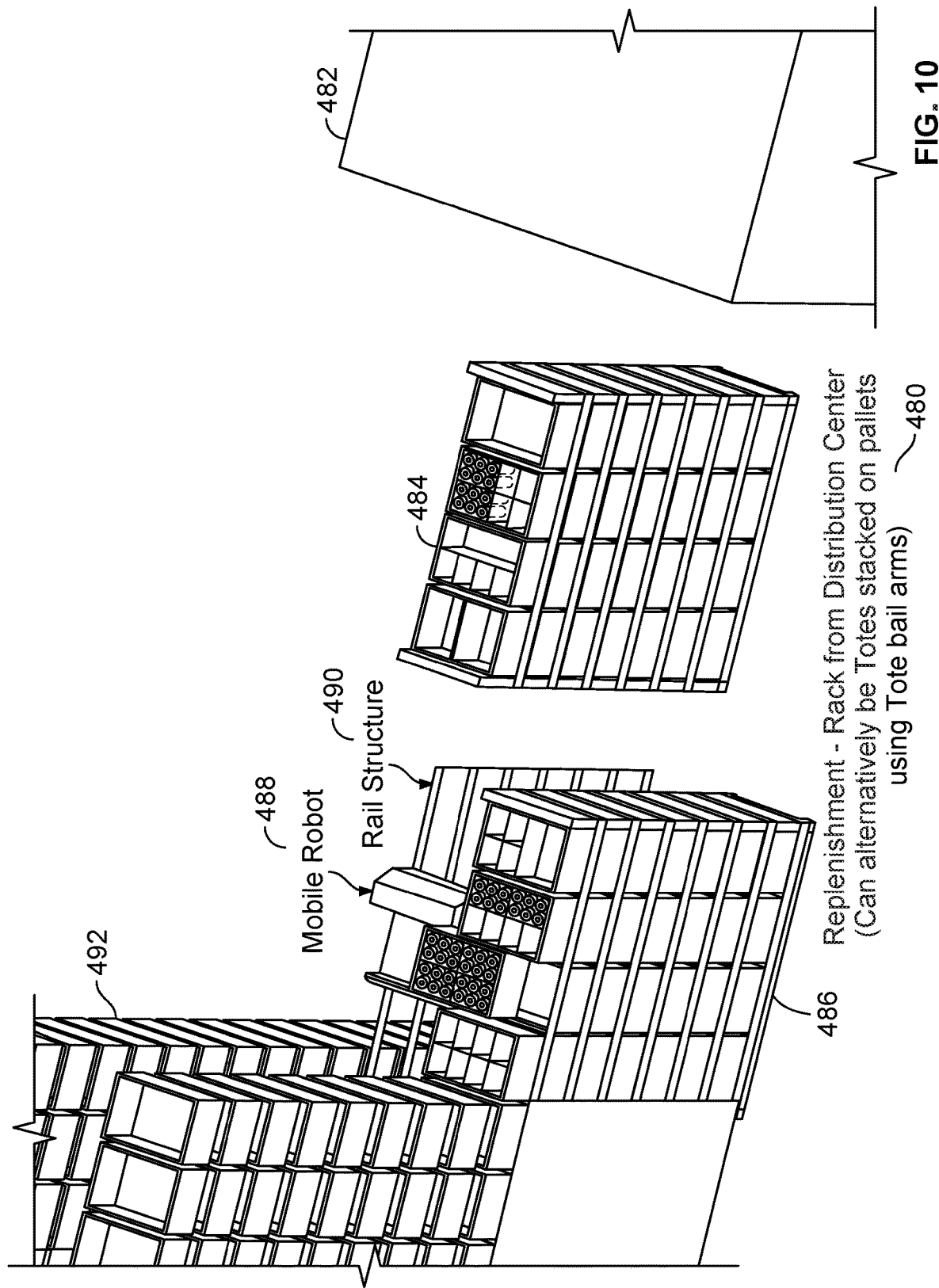
Figure 11:
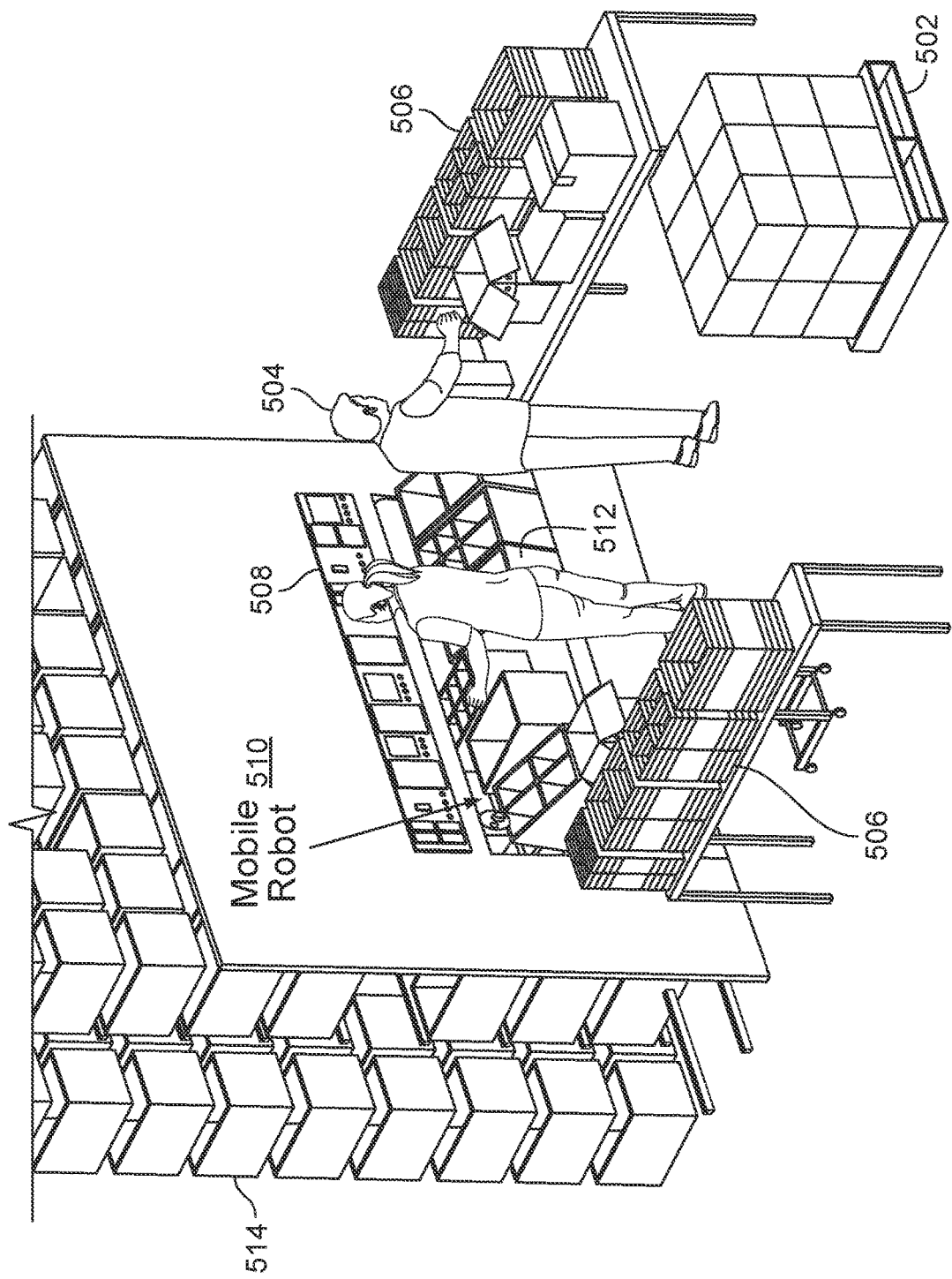
Figure 12:
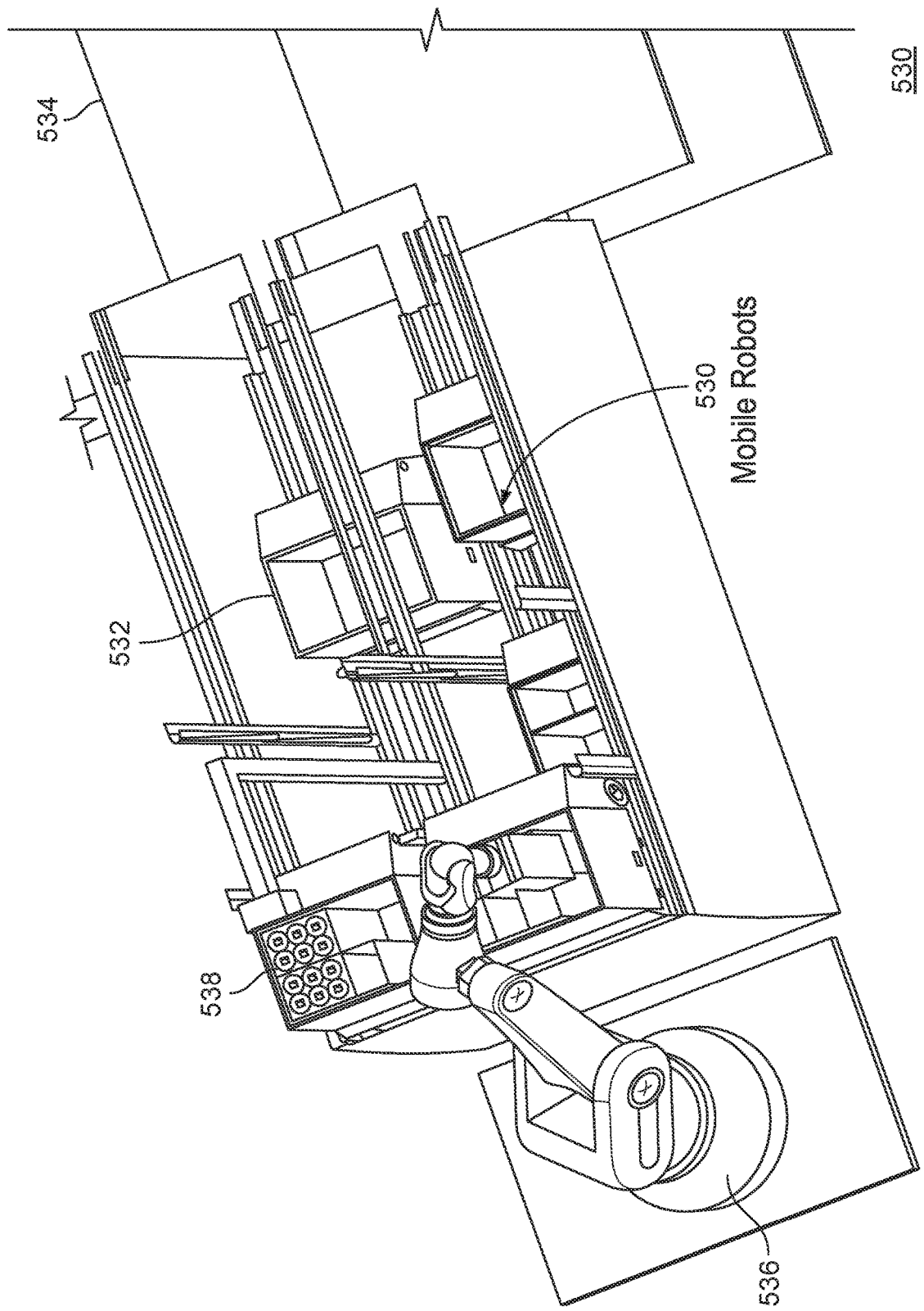
Figure 13:
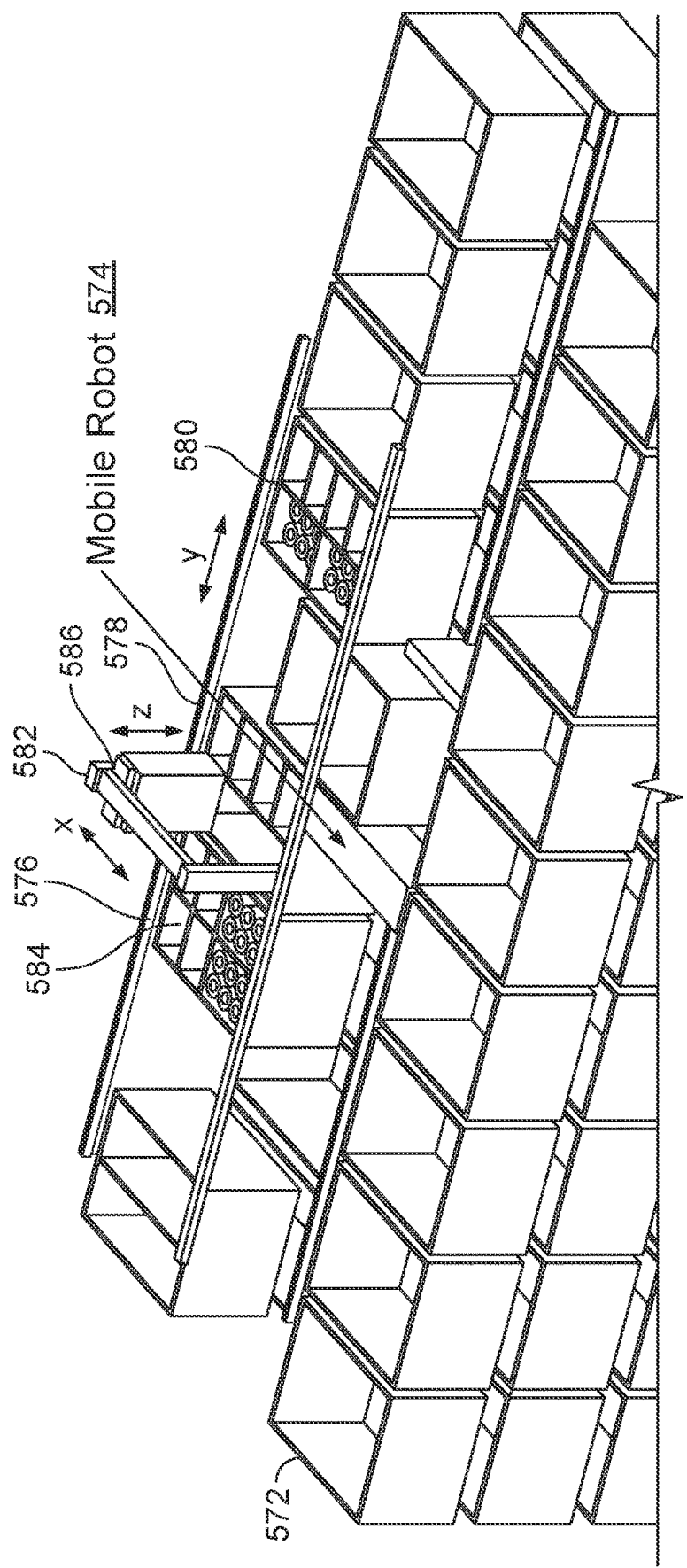
Figure 14:
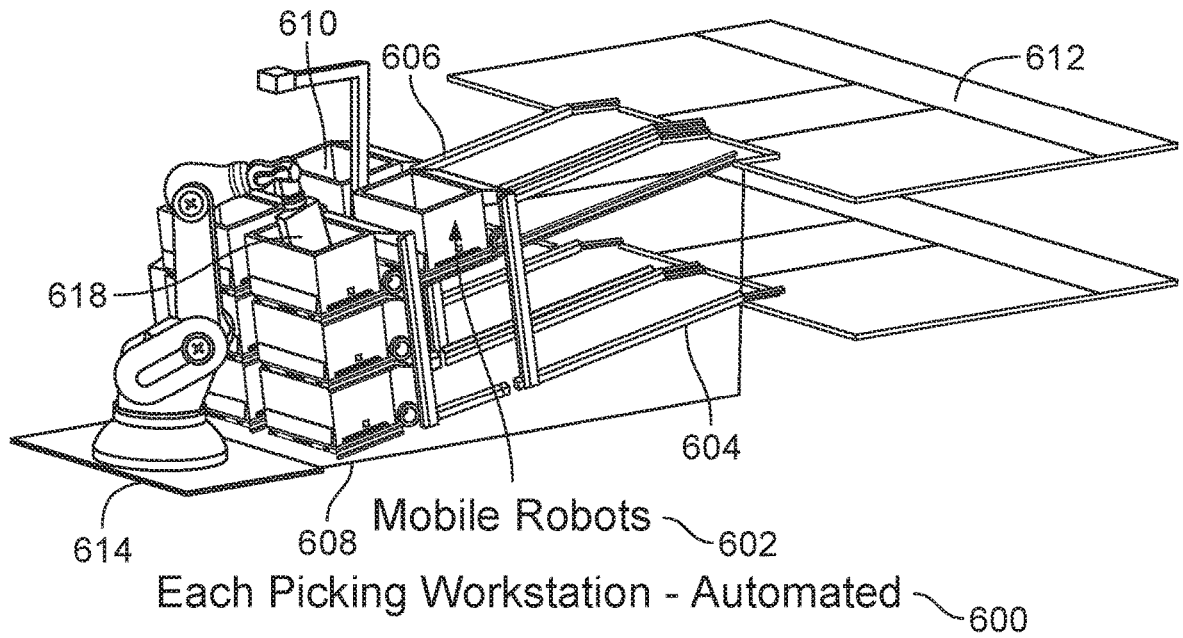
Figure 15:
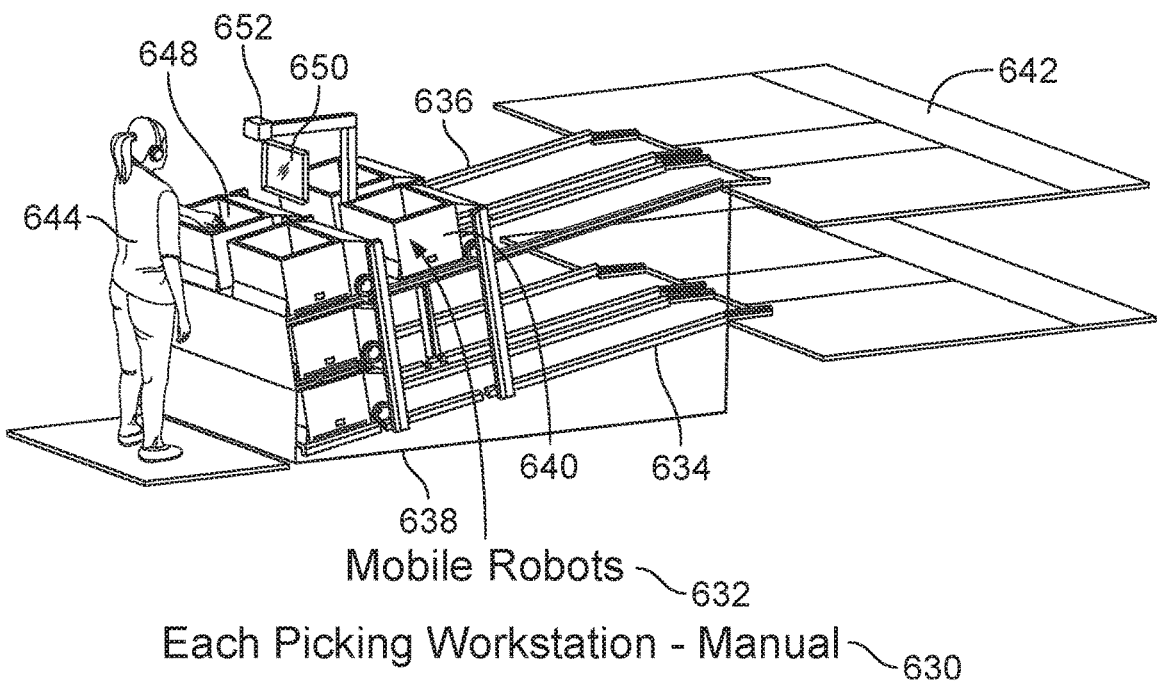
Figure 16:
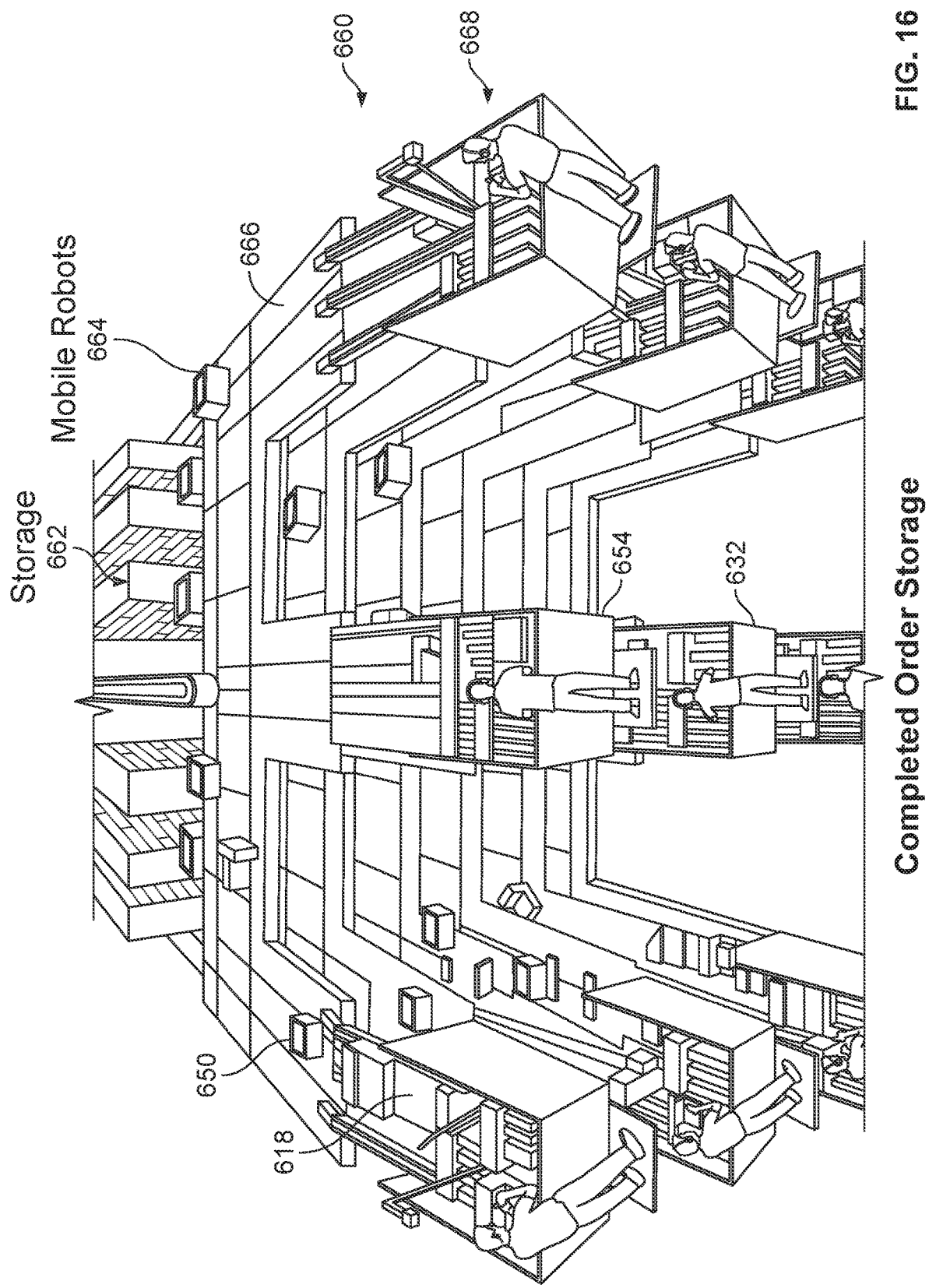
Figure 17:
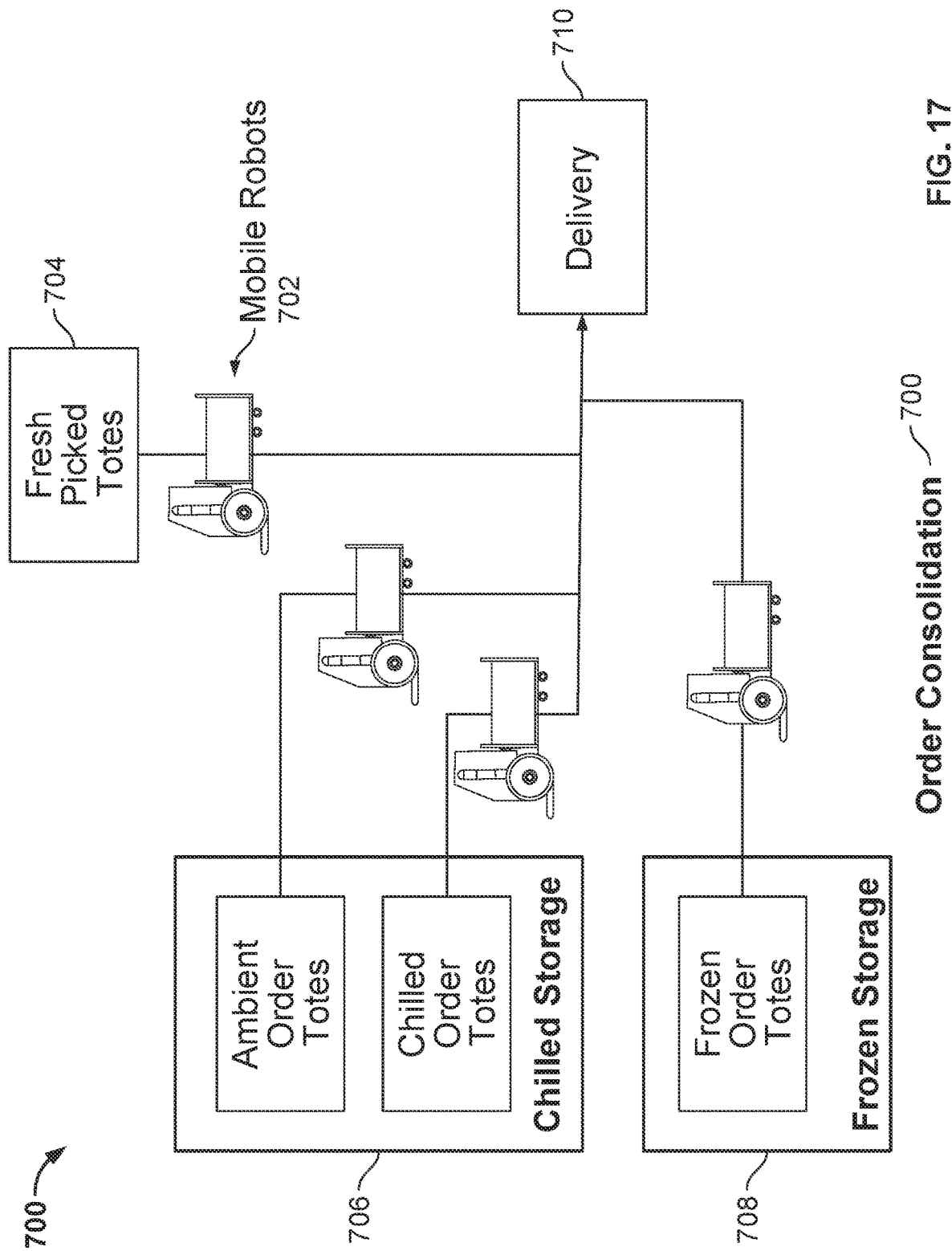
Figure 18:
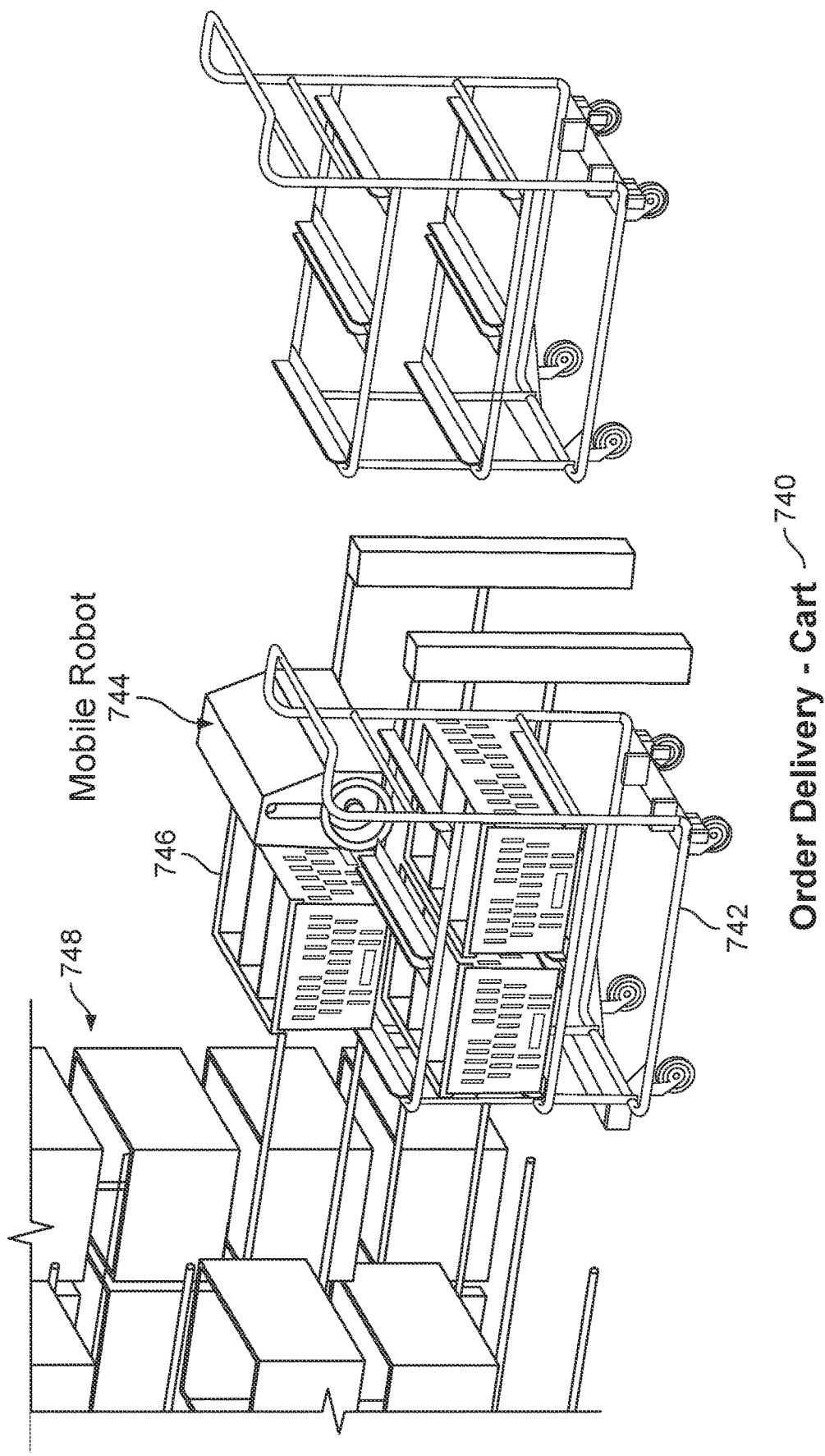
Figure 19:
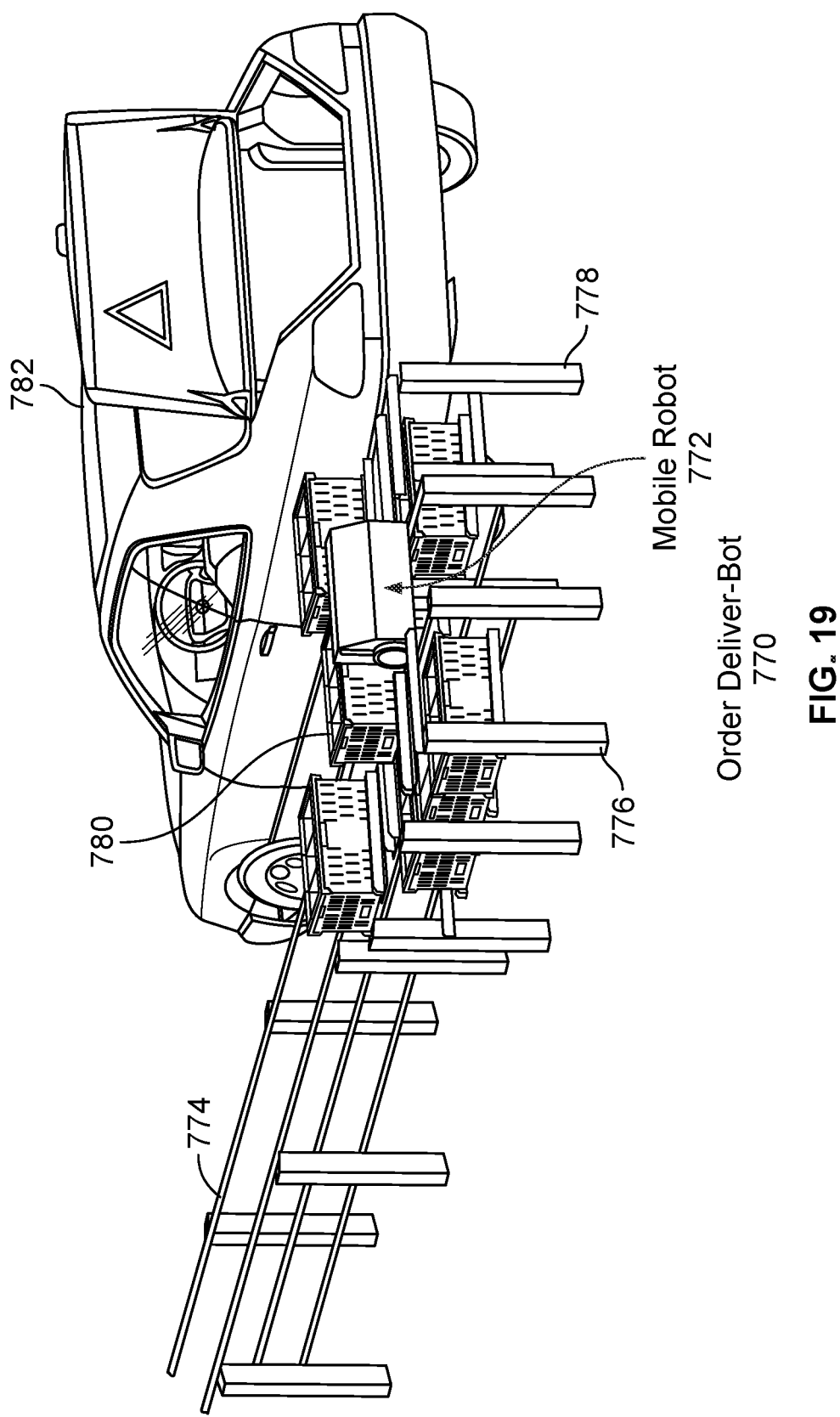

FIG. 1 is an illustrative system for implementing the steps in accordance with the aspects of the embodiment;
FIG. 2 is a process flow diagram;
FIG. 3 is an illustrative system;
FIG. 4 is a market distribution center;
FIG. 5 is an automated distribution center to market process;
FIG. 6 is an automated decant;
FIG. 7 is an automated decant;
FIG. 8 is a system for sub tote transfers;
FIG. 9 is a system for tote transfers;
FIG. 10 is a replenishment system;
FIG. 11 is a manual decanting system;
FIG. 12 is a sub tote transfer system;
FIG. 13 is a sub tote transfer system;
FIG. 14 is an each picking workstation;
FIG. 15 is an each picking workstation;
FIG. 16 shows completed order storage;
FIG. 17 shows order consolidation;
FIG. 18 shows order delivery; and
FIG. 19 shows order delivery.

Referring now to FIG. 1, there is shown an illustrative system 10 for implementing the steps in accordance with the aspects of the embodiment. Although the present embodiment will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

The disclosed embodiment may utilize apparatus and methods as disclosed in U.S. Pat. No. 9,139,363 and entitled "Automated System for Transporting Payloads", U.S. Pat. No. 9,598,239 and entitled "Automated System for Transporting Payloads", U.S. patent application Ser. No. 15/171,802 filed Jun. 2, 2016 and entitled "Storage and Retrieval System", U.S. patent application Ser. No. 15/591,956 filed May 10, 2017 and entitled "Order Fulfillment System", U.S. patent application Ser. No. 15/816,832 filed Nov. 17, 2017 and entitled "Order Fulfillment System", U.S. patent application Ser. No. 15/867,373 filed Jan. 10, 2018 and entitled "System and Method of Robot Task Assignment and management", U.S. patent application Ser. No. 15/826,045 filed Nov. 29, 2017 and entitled "Inventory Management System", U.S. patent application Ser. No. 15/884,677 filed Jan. 31, 2018 and entitled "Automated Proxy Picker System for Non-Fungible Goods"; and U.S. patent application Ser. No. 15/884,938 filed Jan. 31, 2018 and entitled "Packing by Destination for Automated Fulfilled Goods" all of which are incorporated by reference herein in their entirety.

In accordance with the disclosed embodiment, an automated retail supply chain enables market inventory reduction, item level traceability and manufacturer consignment. Here, rapid replenishment of SubTotes matched in size to market velocity (rate of sale of eaches) enables market to decrease inventory on-hand, and offer higher number of SKUs in same or smaller facility as opposed to where markets receive eaches in case or break-pack level not matched to their store velocity. Here, eaches are secured in an automated supply chain with full traceability from receiving of pallet from manufacturer at a Regional Distribution Center (RDC) to sale to customer in an order bag. Such an automated supply chain enables a consignment model where the manufacturer may maintain ownership of goods until the point of sale or delivery. Further, the manufacturer has real time visibility of their inventory via a unified commerce engine throughout the entire supply chain process. The manufacturer may also have access to customer trends and data. As seen in FIG. 1, palletized cases of goods 12 are received at one or more regional distribution center (RDC) 14 where the regional distribution center supplies palletized mixed cases of goods 16 to market distribution center (MDC) 18 where the market distribution center decants and stores like eaches in various sized subtotes 24 and supplies totes containing mixed each subtotes 20, 22 to market 26 as will be described in greater detail below. As an alternative, shipments may be made to stores or markets in Totes directly from the distribution center with no market distribution center or the function of the regional distribution center and market distribution centers may be combined. The market distribution center enables sufficient scale to afford automated decanting, as well as limits the cost of transporting eaches in totes and subtotes to a localized, for example metropolitan area. The more efficient shipping of eaches in densely pack cases on pallets can be maintained between the regional distribution center and the market distribution center. The market distribution center further offers the capability to store a large selection of goods that a customer may order to be delivered to their market on the next rapid replenishment delivery, that is not regularly stored at the market.

Referring now to FIG. 2, there is shown process flow diagram 50. In 52, the manufacturer ships one or more pallet(s) containing cases of eaches to a Regional Distribution Center (RDC). In 54, the pallet ID along with case data is collected and stored in the Unified Commerce Engine (UCE). Pallet, case and item IDs may be barcode labels, RFID tags, or comparable tracking systems. In 56, the pallet is received within the RDC using an Automated Storage and Retrieval System (AS/RS), Alphabot PalletBot. In 58, an order for case replenishment is received from the Market Distribution Center (MDC). In 60, a pallet containing Cases is automatically retrieved from storage. In 62, a robot picks a layer of cases to create a "Rainbow Pallet" or individual cases to create a "Mixed Pallet". In 64, a rainbow or mixed pallet ID is created and stored in the UCE along with case data. In 66, a rainbow or mixed case pallet is received at the MDC. In 68, the UCE calculates a distribution of eaches per subtote (SubTote size) based on served market each velocities. In 70, cases are automatically decanted into a distribution of subtotes sizes and totes of MDC with the Alphabot system. In 72, each data, along with associated parent case and pallet ID, and now subtote and tote ID are stored in the UCE. In 74, the tote containing subtotes is stored in the Alphabot system and corresponding locations stored in the UCE. In 76, the order for SubTote (Eaches) replenishment is received from the market. In 78, bots retrieve product tote (P-Tote) containing SubTotes and empty Order Tote (O-Tote) to a Picking Workstation. In 80, SubTotes are automatically transferred from P-Tote to O-Tote. In 82, subtote and each location are stored in the UCE. In 82, all upstream parent case and pallet data relationships are preserved. In decision 84, is the O-Tote full of P-Totes? If Yes 86 then go on to 90. If No 88 then go to 80. In 90, a bot transports mixed SKU O-Tote to and loads the tote into a rack or alternatively presents to robot to stack on a pallet. In 92, a tote pallet ID is created and stored in the UCE along with the Tote, SubTote, Each and Parent Data. In decision 94, is the pallet full of O-Totes? If Yes 96 then go to 100. If No 98 then go to 90. In 100, the rack or alternatively pallet of O-Totes is loaded into a truck for shipment to market. In 102, the rack or pallet of O-Totes is received at Market and the Totes are transferred automatically into the Market Alphabot System. In 104, the SubTote and Each Location is stored in UCE where all upstream Parent Case and Pallet Data relationships are preserved 104. In 106, a customer order is received and scheduled for picking. In 108, the Material Control System (MCS) calculates the order bag packing distribution and sequence. In 110, bots retrieve P-Totes containing ordered Each SubTotes and O-Tote containing empty order bags to a picking workstation. In 112, each is transferred from P-Tote SubTote to O-Tote Order Bag either in an automated fashion or manual fashion with machine vision tracking. In 114, the Each Location in Order Bag is stored in the UCE where all parent data relationships are preserved. In decision 116, are all Eaches transferred to Order Bags 116? If Yes 118 then go to 122. if No 120 the go to 110. In decision 122, is customer delivery scheduled 122? If Yes 124 then go to 132. If No 126 then go to 128. In 128, the Order Tote containing Order Bags is stored in the Alphabot system. In 130, the Order Location, and all Each and associated Parent Data is stored in the UCE. In 132, at Customer delivery time, Bots retrieve O-Totes containing Order Bags and transport to Customer Cart or Car. In 134, order completion (Sale) of the item is stored in the UCE where all parent location data and history is available to the manufacturer of the item(s). In 136, the retailer pays the manufacturer for eaches sold less an agreed retailer margin 136. In the disclosed method, the UCE calculates a distribution of eaches per subtote (subtote size) based on served market each velocities. The distribution of eaches, the watermark for replenishment and the replenishment rate may be modified by the UCE as a function of velocity for the given SKU where the UCE may employ a drawdown rate monitor or a drawdown rate of change of velocity monitor. Here, the level of inventory for a given SKU at a given market or store may be maintained at an optimized watermark that can be variable as a function of velocity or otherwise to optimize in order to present the highest number of SKU's based on storage area or otherwise.

In addition to the manufacturer being aware of the location of every each from the time it leaves their manufacturing facility, until it is delivered to the customer, the manufacturer may access the UCE database to determine the velocity of their product sales at all locations, customer buying trends and data. The manufacturer may utilize the near real-time UCE data to optimize their manufacturing schedule, shipping schedule, product offering by geography, and product attributes; e.g. flavors, sizes, bundles, etc.

Referring now to FIG. 3 is an illustrative system 150. As described, a unified commerce engine 152 may centrally manage and track inventory levels and distribution. System 150 may have operating manual 154 identifying systems, processes and integration. Mobile customers 156 may be provided with ambient AI, phone UI, Tablet UI and PC or other suitable UI that interfaces with UCE 152 or other UI's, for example, a market or store UI. Market 158 may be provided with phone UI, item reader, large screen UI, scales, checkout kiosk, associate UI, order staging and consolidation, manual pick manager new SMART store MCS, and an Alphabot storage system. Analytics 160 may further be provided. Orders, customers, inventory and product 162 may further interface with UCE 152. MDC 164 with Alphabot storage and retrieval system, DC MC and new warehouse management system (WMS) may further interface with UCE 152. RDC 166 and Retailer enterprise systems 168. may further interface with UCE 152.

Referring now to FIG. 4, there is shown market distribution center 200. Pallets of cases 202 are decanted into sub totes at decanting station 204. Storage apparatus 206 stores totes with or without subtotes. Product totes are presented to a picker to fulfill orders at product tote to order tote station 208. Order totes are loaded into portable racks 210 to be transported by truck or otherwise to fulfill orders.

Referring now to FIG. 5, there is shown an automated market distribution center to market process 250. The process is broken down into three areas: receiving 252, order fulfillment 254, and store replenishment 256. In 258, a Supply truck arrives at the automated DC. In 260, a Scan of pallet ID is performed. In 262, transport the pallet from the supply truck to an automated decant station. In 264, scan the case label. In decision 266, is the SKU known? If Yes 268 then go to 272. If No 270 then go to 274. In 272, determine the optimal sub tote distribution based on MSRQ (minimum safe replenishment quantity). In 274, capture the SKU and case attributes. In 276, select sub totes from a stack of variable sized sub totes. In 278, open the case. In 280, transfer all eaches from case to sub totes 280. In 282, discard the empty case. In 284, place sub totes into product totes. In decision 286, is the product tote full? If Yes 288 then go to 292. If No 290 then go to 264. In 292, induct the (product tote) P-tote into the storage structure. In 294, transport the P-tote to an automated picking station. In 296, transfer sub totes from p-tote to (order tote) O-tote based on SRQ (safe replenishment quantity) of individual store. In 298, transport the P-tote back to the storage structure. In decision 300, is the O-tote full? If Yes 302 then go to 306. If No 304 then go to 294. In decision 306 is the order to be delivered immediately? If Yes 308 then go to 312. If No 310 then go to 314. In 312, transport the o-tote to a mobile storage rack. In 314, transport the o-tote into the storage structure 314. In decision 316, is the storage rack full? If Yes 318 then go to 322. If No 320 ten go to 312. In 322, transport the mobile storage rack onto a delivery truck. In 324, the delivery truck arrives at the automated store. At 326, induct mobile rack into storage structure at the automated store.

Referring now to FIG. 6, there is shown an automated decant station 350 at a market distribution center. Referring also to FIG. 7, there is shown an automated decant station 350 at a market distribution center. A pallet with cases 352 is initially introduced to the decant station. First robot arm 354 picks cases and places them with box cutter 356 where boxcutter 356 removes cardboard exposing eaches 358. Second robot arm 360 picks eaches while cardboard conveyor 362 disposes of the cardboard from the box cutter. Sub totes of various sizes 364 are loaded with an appropriate number of eaches and provided within totes 366 that are inducted into storage apparatus 368 as product totes.

Referring now to FIG. 8, there is shown a system or station for sub tote transfers 400 to assemble market tote orders. Here, mobile robots 402 bring product totes and order totes 404 to robot 406 where robot 406 picks subtotes from product totes and selectively deposits the subtotes into market order totes.

Referring now to FIG. 9, there is shown a system 450 for tote transfers for the transfer of lots from a market DC to markets. Although racks are shown, alternately the totes may be directly stacked on pallets using tote bail arms with out the use of racks. Storage apparatus 452 stores product totes and order totes. Portable racks 456 may be loaded by mobile robots 454 with order totes to make up market orders, for example combinations of totes with sub totes 458. Trucks 460, 462 may be provided to transport racks that may be loaded manually or by mobile robot 464.

Referring now to FIG. 10, there is shown a replenishment system or station 480 for replenishment from rack to distribution center. Although racks are shown, alternately the totes can be directly stacked on pallets using tote bail arms without the use of racks. Truck 482 may provide racks 484, 486 where mobile robot 488 operating on rail structure 490 may pick the totes from the racks to replenish the storage structure 492.

Referring now to FIG. 11, there is shown a manual decanting system or station 500 for receiving of cases and manual decanting at market as an alternate embodiment without market DC decanting. Here, palletized cases 502 may be depalletized by operator 504 where subtotes 506 may be loaded with eaches from the de palletized cases by operator 508. The subtotes may be loaded into totes 512 where mobile robot 510 may pick tote 512 to be inducted into storage apparatus 514.

Referring now to FIG. 12, there is shown a sub tote transfer system or station 530 for automated sub tote transfer for system defragmentation. In alternate aspects the system could be manual with an operator instead of a robot. Mobile robots 530 provided totes 532 from transport and storage apparatus 534. Robot 536 is provided to consolidate empty subtotes 538 into totes in order to defragment tote storage, and increase storage density within the system.

Referring now to FIG. 13, there is shown an alternate sub tote transfer system 570 for automated sub tote transfer for system defragmentation within storage structure 572. Here, Mobile robots 574 provides totes 576, 578, 580 to a station having cartesian pick and place robot 582 that is adapted to transfer subtotes 584 from tote to tote. Robot 862 has gripper 586 that can be selectively actuated to pick or release a sub tote and move along Z, X and Y axes.

Referring now to FIG. 14, there is shown an automated each picking workstation 600. Mobile robots 602 are provided moveable on rails 604, 606 and verticals 608. Robot 614 selectively accesses totes 610 having eaches 618 where the totes are transported and stored within decks or storage 612 and selectively accessible by robots 602.

Referring now to FIG. 15, there is shown a manual each picking workstation 630. Mobile robots 632 are provided moveable on rails 634, 636 and verticals 638. Operator 644 selectively accesses totes 640 having eaches 648 where the totes are transported and stored within transit decks or storage 642 and selectively accessible by robots 632. UI 650 and direction light beam 652 may be provided to direct the operator or picker 644.

Referring now to FIG. 16, there is show completed order storage system 660. Storage structure 662 is provided with mobile robots 664, transit decks with or without verticals 666, and picking workstations 668.

Referring now to FIG. 17, there is shown order consolidation 700. Mobile robots consolidate fresh picked totes 704, chilled storage totes 706 such as ambient order totes and chilled order totes, and frozen storage totes 708 such as frozen order totes for delivery 710.

Referring now to FIG. 18, there is shown order delivery 740 by cart 742. Here, mobile robot 744 selectively provides totes 746 from storage apparatus 748 to cart 742.

Referring now to FIG. 19, there is shown order delivery 770 by mobile robot 772. Here, rails 774 from storage structure are utilized by robots 772 where totes 780 are delivered from storage to loading stations 776, 778 for pick up, for example, by vehicle 782.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may exist in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Further, the terms "robot" and "bot" are utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Unless otherwise noted or defined herein, to the extent directional vocabulary is utilized, the disclosure and figures are described with reference to a conventional three-dimensional coordinate axis system of X, Y and Z, where the X direction is generally left-right or east-west, the Y direction is generally in-out, relative to the plane of the page of the document, and the Z direction is generally up-down or north-south on the page. Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Z-axis lies in the vertical direction and the X and Y axes lie in the horizontal plane with the vertical Z axis being orthogonal thereto. To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

SUMMARY

The present technology, roughly described, relates to a system comprising a fully automated supply chain, in combination with tracking technology and the unified commerce engine (UCE). Such a system enables the exact location of every item (or each) to be tracked from the manufacturer's facility to a customer's bag. In accordance with one example, the supply chain comprises an order fulfillment system having a regional distribution center with RDC robotic automation configured to accept one or more incoming pallets, each pallet having a plurality of common cases of goods with each case of goods containing a plurality of common eaches; the RDC robotic automation further configured to remove and store the common cases of goods; the RDC robotic automation further configured to provide one or more outgoing pallets in response to a distribution center order, each outgoing pallet having a plurality of mixed cases of goods; a market distribution center having MDC robotic automation configured to accept one or more of the outgoing pallets, the MDC robotic automation further configured to remove mixed cases of goods from the one or more outgoing pallets; the MDC robotic automation further configured to remove and store eaches from each of the mixed cases of goods in an MDC storage system, the MDC robotic automation further configured to selectively retrieve eaches from the MDC storage system and fill order totes with mixed each subtotes in response to a market order. The MDC robotic automation further configured to fulfill the market order with a plurality of common or different order totes and subtotes that flexibly match the sales velocity of the market.

In accordance with another example, the fully automated supply chain enables a consignment model where the manufacturers are able to retain ownership of the each until it reaches the customer's bag. This is in contrast to present systems, where retailers take ownership because they cannot guarantee the location and safety of the each to the manufacturer.

In accordance with another example, the regional distribution center fulfills orders from a plurality of market distribution centers.

In accordance with another example, the regional distribution center and market distribution center comprise a consolidated distribution center.

In accordance with another example, the market distribution center enables scale to automate decanting (i.e., transferring from cases to various sized totes/subtotes), and minimizes the transportation cost of shipping eaches in totes/subtotes that are less dense than cases on pallets. For example, mixed cases may be shipped on pallets for long hauls (e.g., thousands of miles) from manufacturers or regional distribution centers to market distribution centers. At the market distribution centers, the pallets are broken into lower density totes and subtotes, which are then shipped shorter distances (e.g. tens of miles) to markets.

In accordance with another example, the market distribution center and automated supply chain in general enables eaches to be shipped to markets in totes/subtotes that match the sales velocity of the market. This allows the markets to take advantage of rapid replenishment, minimized inventory, and to offer customers more products (SKU's) in a smaller store. This solves a significant problem in current markets of whether to limit selection or increase store size. If selection is limited, they lose customers. If they increase selection, the store must be larger to store the each received at case level. With the present technology, markets can provide an increased selection without increasing store size.

In accordance with a further example, as manufacturers optimize the size of their products to the customers, and the use of totes and subtotes becomes more prevalent, it is anticipated they will also optimize their packaging to fit efficiently within the totes and subtotes.

In accordance with another example, at least one processor; and at least one non-transitory memory including computer program code are provided, the at least one memory and the computer program code configured to, with the at least one processor to provide traceability of the goods and automation securing and/or tracking the goods at substantially all times from intake of the oncoming pallets to delivery of the market order.

In accordance with another example, the totes comprise a common tote containing sub totes.

In accordance with another example, the market order comes from a market in response to an inventory depletion level, the market robotic automation configured to accept the market order fulfilled by the plurality of order totes with mixed eaches, market robotic automation further configured to remove and store the mixed eaches in market storage; the market robotic automation further configured to selectively retrieve eaches from the market storage system and fulfill a customer order of a plurality of customer order mixed eaches in response to the customer order.

In accordance with another example, the market is a retail store.

In accordance with another example, the market is any suitable distribution center.

In accordance with another example, the plurality of customer order mixed eaches contains an order consolidation of one or more frozen storage totes, chilled storage totes or fresh picked totes.

In accordance with another example, a unified commerce engine comprises at least one processor; and at least one non-transitory memory including computer program code, the unified commerce engine configured to, monitor SKU velocity of one or more markets and optimize the inventory levels of the one or more markets to present the highest number of SKU's for the one or more markets based on the inventory storage capacity of the one or more markets.

In accordance with another example, a unified commerce engine comprises at least one processor; and at least one non-transitory memory including computer program code, the unified commerce engine configured to monitor and optimize inventory level and inventory velocity of one or more regional distribution centers and replenishing one or more market distribution centers and replenishing one or more markets throughout the entire supply chain process from case level intake at regional distribution centers through customer order fulfillment at markets.

In accordance with another example, a unified commerce engine comprises at least one processor; and at least one non-transitory memory including computer program code, the unified commerce engine configured to secure eaches in an automated supply chain and fully trace eaches in the automated supply chain from receiving of pallet from the manufacturer at a regional distribution center to a sale to a customer, the unified commerce engine further configured to enable a consignment model where the manufacturer maintains ownership of goods until a point of sale or delivery and where the manufacturer has real time visibility of their inventory via a unified commerce engine throughout the entire supply chain process.

In accordance with another example, a unified commerce engine comprises at least one processor; and at least one non-transitory memory including computer program code, the unified commerce engine configured to secure eaches in an automated supply chain and fully trace eaches in the automated supply chain from receiving of pallet from the manufacturer at a regional distribution center to a sale or delivery to a customer, the unified commerce engine further configured to present data to the manufacturer with respect to the manufacturers goods contained in the retail supply chain, the data comprising the location, inventory level, inventory velocity, sales levels and otherwise related to goods in the retail supply chain within and throughout the entire supply chain process; the unified commerce engine further configured to present data with respect to all of the goods contained in the retail supply chain, the data comprising the location, inventory level, inventory velocity, sales levels and otherwise related to goods in the retail supply chain within and throughout the entire supply chain process; the unified commerce engine further configured to segregate and present data with respect to segregated goods contained in the retail supply chain, the data comprising the location, inventory level, inventory velocity, sales levels and otherwise related to goods in the retail supply chain within and throughout the entire supply chain process, the segregated goods segregated by a relationship or otherwise such as market segregated data, manufacturer segregated data or otherwise.

We claim:

1. An automated supply chain for end to end tracking of eaches, comprising:
    one or more distribution centers for receiving eaches from a manufacturer and delivering the eaches to a market;
    one or more of pallets, cases and totes for transporting the eaches, the one or more of pallets, cases and totes comprising tracking systems;
    a plurality of robots at the one or more distribution centers for sorting the eaches for shipment between the one or more distribution centers and the market;
    a unified commerce engine (UCE) comprising at least one processor and at least one non-transitory memory including computer program code, the unified commerce engine configured to receive and store identification information from the tracking systems, the UCE tracking locations of the eaches within the pallets, cases and totes in each of the one or more distribution centers from receipt from the manufacturer to delivery to the market using the identification information;
    the one or more distribution centers comprise a decanting station configured to receive at least a subset of cases of the one or more of pallets, cases and totes, where the subset of cases are broken down and one or more eaches from the subset of cases are positioned into each of a set of product totes, of the totes, wherein the unified commerce engine, in tracking the location of the eaches, maintains an association of an identification of the eaches with a tote identification of a respective one of the product totes into which the respective each is positioned;
    a set of mobile robots of the plurality of robots, wherein the set of mobile robots is each controlled to transport the product totes from the decanting station to storage locations within the respective one of the one or more distribution centers and the unified commerce engine in storing the identification information stores a tote location, within the respective distribution center, where the respective product tote is positioned; and wherein the unified commerce engine in storing the identification information comprises storing an identification of a respective each, of the eaches from the subset of cases, and preserving in association with the identification of the respective each corresponding upstream parent pallet and case relationship from which the respective each is decanted, and associate the identification of the respective each with the tote identification and the respective tote location.

2. The automated supply chain of claim 1, wherein the tracking systems are one of a barcode label and RFID tag.

3. The automated supply chain of claim 1, wherein the one or more of pallets, cases and totes for transporting the eaches comprise one of:
a pallet of homogeneous cases of items received from the manufacturer comprising the item,
a rainbow pallet comprising the item at the one or more distribution centers, the rainbow pallet comprising heterogenous levels of cases of items, each level including homogeneous cases of items,
a mixed pallet comprising the item at the one or more distribution centers, the mixed pallet comprising heterogenous cases of items.

4. The automated supply chain of claim 1, wherein the one or more of pallets, cases and totes for transporting the eaches comprise one of:
a product tote for storing eaches in a storage rack of the one or more distribution centers;
an order tote including eaches for fulfilling an order, and an order bag including eaches for fulfilling an order.

5. The automated supply chain of claim 1, wherein the UCE is configured to present data to the manufacturer with respect to the eaches contained in the supply chain, the data comprising at least one of the location, inventory level, inventory velocity, sales levels throughout the supply chain.

6. The automated supply chain of claim 1, wherein an order from the market for an each is stored in the UCE.

7. The automated supply chain of claim 1, wherein a sale of an each at the market is stored in the UCE.

8. The automated supply chain of claim 1, wherein the decanting station breaks down shipments of eaches from cases to at least one of totes and subtotes.

9. The automated supply chain of claim 8, wherein the plurality of robots comprise a decanting robot for breaking down cases of eaches into at least one of totes and subtotes.

10. The automated supply chain of claim 9, further comprising a sensor configured to read the tracking systems, the sensor being part of or associated with the decanting robot to track and identify eaches arriving at the one or more distribution centers.

11. The automated supply chain of claim 1, wherein the one or more distribution centers comprise a regional distribution center and a market distribution center, eaches shipping from the market distribution center to the market.

12. The automated supply chain of claim 1, wherein eaches are shipped to the market in at least one of totes and subtotes that match a sales velocity of the market.

13. The automated supply chain of claim 1, wherein the one or more distribution centers comprise a market distribution center.

14. The automated supply chain of claim 13, wherein the market distribution center comprises:
a first group of one or more robots configured to accept pallets comprising cases of eaches;
a second group of one or more robots configured to remove eaches from the cases and store the eaches;
a third group of one or more robots configured to selectively retrieve stored eaches to fill a market order.

15. The automated supply chain of claim 14, wherein the one or more robots of the third group of one or more robots are directed to fill order totes with mixed each subtotes in response to the market order.

16. The automated supply chain of claim 1, wherein the market comprises one of a retail store and a distribution center.

17. A method of tracking eaches in an automated supply chain, the method comprising:
receiving eaches at each of one or more distribution centers from one or more manufacturers;
receiving and storing, through a unified commerce engine (UCE) comprising at least one processor and at least one non-transitory memory including computer program code, identification information from tracking systems each cooperated with one of one or more of pallets, cases and totes each configured to transport one or more of the eaches;
delivering the eaches to a market;
directing a plurality of robots at the one or more distribution centers in sorting the eaches for shipment between the one or more distribution centers and the market;
tracking locations, through the UCE, of the eaches within the pallets, cases and totes in each of the one or more distribution centers from receipt from the one or more manufacturers to delivery to the market using the identification information;
receiving, by a decanting station at the one or more distribution centers, at least a subset of cases of the one or more of pallets, cases and totes, where the subset of cases are broken down and one or more eaches from the subset of cases are positioned into each of a set of product totes, of the totes;
maintaining, by the unified commerce engine in tracking the location of the eaches, an association of an identification of the eaches with a tote identification of a respective one of the product totes into which the respective each is positioned;
transporting, by a set of mobile robots of the plurality of robots, the product totes from the decanting station to storage locations within the respective one of the one or more distribution centers and the unified commerce engine in storing the identification information stores a tote location, within the respective distribution center, where the respective product tote is positioned;
storing, by the unified commerce engine in storing the identification information, an identification of a respective each, of the eaches from the subset of cases and preserving in association with the identification of the respective each corresponding upstream parent pallet and case relationship from which the respective each is decanted, and associating the identification of the respective each with the tote identification and the respective tote location.

18. The automated supply chain of claim 1, wherein the plurality of robots comprise tote transport robots controlled, based on the tracked location of the totes, to retrieve a respective tote of the totes based on the identification of the one or more eaches within the respective tote and transport the tote to a fulfillment area within a respective one of the one or more distribution centers.

\* \* \* \* \*